United States Patent Office
3,270,014
Patented August 30, 1966

---

3,270,014
1,2-DIHYDRO-1-HYDROXY-1,3,5-TRIAZINES
Joseph J. Ursprung and Gerald R. Zins, Portage, Mich., assignors to The Upjohn Company, Kalamazoo, Mich., a corporation of Delaware
No Drawing. Filed July 1, 1965, Ser. No. 468,940
31 Claims. (Cl. 260—247.5)

This application is a continuation-in-part of copending application Serial No. 273,281, filed April 16, 1963, and now abandoned, and of copending application Serial No. 217,542, filed August 17, 1962, and now abandoned, the latter application being a continuation-in-part of copending application Serial No. 171,832, filed February 8, 1962, and now abandoned.

This invention relates to novel dihydrotriazines and to processes for their preparation, and is more particularly concerned with novel 1,2 - dihydro - 1 - hydroxy-1,3,5-triazines which can be represented by the formula:

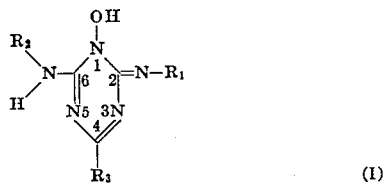

(I)

wherein $R_1$ adn $R_2$ are selected from the group consisting of hydrogen and alkyl of 1 to 4 carbon atoms, inclusive, and wherein $R_3$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula. When $R_1$ and $R_2$ are both alkyl, they can be the same or different. When $R_3$ is dialkylamino, the alkyls therein can be the same or different. When $R_3$ is a heterocyclic moiety, the alkyls which can be attached thereto can be all different or any two or all of them can be alike. When $R_1$ and/or $R_2$ are alkyl, they can be the same as or different than any of the alkyls associated with $R_3$.

This invention is also particularly concerned with novel 1,2-dihydro-1-hydroxy-1,3,5-triazines which can be represented by the formula:

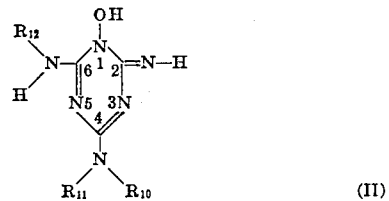

(II)

wherein $R_{10}$ is lower alkenyl, and $R_{11}$ and $R_{12}$ are selected from the group consisting of hydrogen, lower alkyl, and lower alkenyl. $R_{11}$ and $R_{12}$ can be the same or different. When $R_{11}$ and/or $R_{12}$ are lower alkenyl, either or both can be the same as or different than $R_{10}$.

The novel 1,2-dihydro-1-hydroxy-1,3,5-triazines of this invention can be represented by formulas as other than Formulas I and II. Among these are:

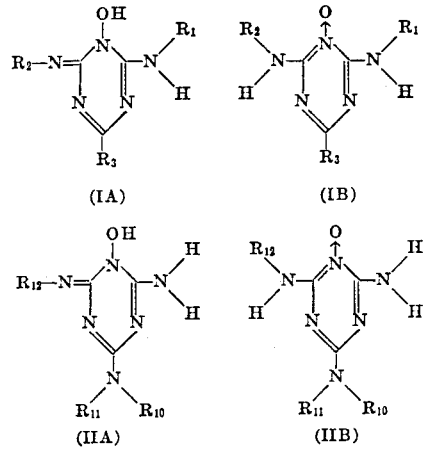

(IA)   (IB)
(IIA)  (IIB)

These Formulas IA and IB and Formulas IIA and IIB compounds are tautomeric with Formulas I and II compounds, respectively. For convenience, reference will be made hereinafter only to Formulas I and II. It is to be understood, however, that the novel compounds of the invention are likely to be mixture of tautomeric forms, the compositions of which are dependent on such factors as the nature of $R_1$, $R_2$, and $R_3$, or $R_{10}$, $R_{11}$, and $R_{12}$, and the environment. In some instances, however, one form or another may predominate.

Examples of alkyl of 1 to 4 carbon atoms are methyl, ethyl, propyl, butyl, and isomeric forms thereof. Examples of lower alkyl and of alkyl of 1 to 8 carbon atoms are methyl, ethyl, propyl, butyl, pentyl, hexyl, heptyl, octyl, and isomeric forms thereof. Examples of heterocyclic moieties within the scope of $R_3$, in addition to those already mentioned above, are 2-methylaziridinyl, 2-ethylaziridinyl, 2-butylaziridinyl, 2,3-dimethylaziridinyl, 2,2 - dimethylaziridinyl, 2 - methylazetidinyl, 3 - methylazetidinyl, 2-octylazetidinyl, 2,2-dimethylazetidinyl, 3,3-diethylazetidinyl, 2,4,4 - trimethylazetidinyl, 2,3,4, - trimethylazetidinyl, 2 - methylpyrrolidinyl, 3 - butylpyrrolidinyl, 2 - isohexylpyrrolidinyl, 2,3 - dimethylpyrrolidinyl, 2,2 - dimethylpyrrolidinyl, 2,5-diethylpyrrolidinyl, 3-tert-butylpyrrolidinyl, 2,3,5-trimethylpyrrolidinyl, 3,4-di-octyl-pyrrolidinyl, 2-methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6,-trimethylpiperidino, 2,6-dimethyl-4-octylpiperidino, 2,3,5-triethylpiperidino, 2-ethylhexahydroazepinyl, 4-tert-butylhexahydroazepinyl, 3-heptylhexahydroazepinyl, 2,4-dimethylhexahydroazepinyl, 3,3 - dimethylhexahydroazepinyl, 2,4,6 - tripropylhexahydroazepinyl, 2-methylheptamethylenimino, 5-butylheptamethylenimino, 2,4-diisopropylheptamethylenimino, 3,3 - diethylheptamethylenimino, 2,5,8-trimethylheptamethylenimino, 3-methyloctamethylenimino, 2,9 - diethyloctamethylenimino, 4 - isooctyloctamethylenimino, 2-ethylmorpholino, 2 - methyl - 5 - ethylmorpholino, 3,3 - dimethylmorpholino, 2,6-di-tert-butylmorpholino, and the like. In each of the above examples of heterocyclic moieties, the free valence, and hence the point of attachment to a carbon atom of the triazine ring, is at the heterocyclic nitrogen atom. Examples of lower alkenyl are vinyl, allyl, 2-methylpropenyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl - 2 - butenyl, 3-pentenyl, 2,3-dimethyl-2-butenyl, 1,1,2-trimethylallyl, 1,3-dimethyl-2-butenyl, 1-ethyl-2-butenyl, 4-methyl-2 - pentenyl, 2-ethyl-2-pentenyl, 4,4-dimethyl-2-pentenyl, 1,4-dimethyl-4-hexenyl, and the like. Advantageously, $R_{11}$ is either lower alkenyl or lower alkyl, and $R_{12}$ is hydrogen.

The novel 1,2-dihydro-1-hydroxy - 1,3,5 - triazines of Formulas I and II are amines and exist either in the non-protonated (free base) form or the protonated (acid addition salt) form depending upon the pH of the environment. They form stable protonates (mono- and diacid addition salts) on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methane-sulfonic, cyclohexansulfamic, and lactic acids, and the like pharmacologically acceptable acids.

The compounds of Formulas I and II are orally and parenterally active in birds and mammals, including man, as antihypertensive agents having vasodilatory activity, and are useful for lowering blood pressure and for the treatment of shock. For these purposes, they can be used in the non-protonated (free base) form or in the protonated (acid addition salt) form in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, antihistamines and other antihypertensives. The compounds of Formulas I and II can also be used as antisecretory agents and central nervous system depressants.

The novel 1,2-dihydro-1-hydroxy-1,3,5-triazines of Formulas I and II can also be used for making aminoplast resins by condensation with formaldehyde. The acid addition salts of the dihydrotriazines are also useful for upgrading the corresponding free bases. The dihydrotriazines also form salts with thiocyanic acid which, when condensed with formaldehyde, form resinous materials useful as pickling inhibitors according to U.S. Patents 2,425,320 and 2,606,155. They also form salts with fluosilicic acid which are useful as mothproofing agents according to U.S. Patents 1,915,334 and 2,075,359.

The novel Formula I dihydrotriazines are prepared by oxidizing a triazine of the formula:

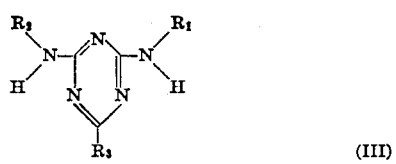

(III)

wherein $R_1$, $R_2$, and $R_3$ are as given above, with a perbenzoic acid of the formula:

(IV)

wherein X is selected from the group consisting of halogen, lower alkyl, lower alkoxy, and nitro, and $n$ is zero to 5, inclusive.

The novel Formula II dihydrotriazines are prepared by oxidizing a triazine of the formula:

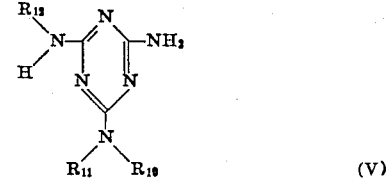

(V)

wherein $R_{10}$, $R_{11}$, and $R_{12}$ are as given above, with a Formula IV perbenzoic acid.

Unlike the usual tertiary amines, the triazines of Formulas III and V cannot be effectively oxidized to the desired 1,2-dihydro-1-hydroxy-1,3,5-triazines under ordinary conditions with hydrogen peroxide, peracetic acid, or peroxytrifluoroacetic acid. Some anomaly apparently causes these triazines to behave in an atypical manner.

Triazines (melamines) of Formulas III and V are known in the art or can be prepared by methods known in the art [Smolin et al., "s-Triazines and Derivatives," Interscience Publishers Inc., New York, N.Y., pp. 351–71 (1959)]. For example, they can be prepared conveniently from cyanuric chloride (2,4,6-trichloro-1,3,5-triazine) by appropriate replacement of the three chlorines with primary, secondary, and tertiary (including heterocyclic) amino moieties. [Pearlman et al., J. Am. Chem. Soc. 70, 3726–8 (1948); Thurston et al., J. Am. Chem. Soc. 73, 2981–3 (1951); Kaiser et al., J. Am. Chem. Soc. 73, 2984–6 (1951); Detweiler et al., J. Am. Chem. Soc. 74, 1483–5 (1952); Schaefer et al., J. Am. Chem. Soc. 77, 5918–22 (1955); Campbell et al., J. Org. Chem. 26, 2786–9 (1961); Walker et al., J. Am. Pharm. Assoc., Sci. ed. 39, 393–6 (1950); Kaiser et al., U.S. Patent 2,653,934] Illustratively, 2-chloro-4,6-di-amino-1,3,5-triazine can be prepared by reacting cyanuric chloride with two molecular equivalents of ammonia, and can then be reacted with a secondary amine, $R_3H$, for example, dimethylamine or piperidine, to give a Formula III triazine wherein $R_1$ and $R_2$ are hydrogen and $R_3$ is as given above. Further, 2-amino-4,6-dichloro-1,3,5-triazine can be prepared by reacting cyanuric chloride with one molecular equivalent of ammonia, and can then be reacted successively with a primary alkylamine containing 1 to 4 carbon atoms, for example, ethylamine, and a secondary amine, $R_3H$, for example, dimethylamine or piperidine, to give a Formula III triazine wherein $R_1$ is hydrogen, $R_2$ is alkyl of 1 to 4 carbon atoms, and $R_3$ is as given above. Further, reaction of two molecular equivalents of an appropriate primary amine with cyanuric chloride followed by reaction with a secondary amine will give a Formula III triazine wherein $R_1$ and $R_2$ are both alkyl of 1 to 4 carbon atoms and $R_3$ is as given above.

As will be apparent to those skilled in the art, the appropriate amounts of ammonia, primary amine, and secondary amine can be reacted with cyanuric chloride in any order, for example, the order given above, or first, the secondary amine, followed successively by ammonia and a primary amine in either order. Suitable primary amines for this purpose are methylamine, ethylamine, propylamine, isopropylamine, butylamine, and the like. Suitable secondary amines for this purpose are dimethylamine, diethylamine, N-methylethylamine, dipropylamine, N-ethylisopropylamine, di-sec-butylamine, N-methylbutylamine, dipentylamine, N-ethyl-2,4-dimethylpentylamine, N-methyloctylamine, diheptylamine, aziridine, 2-methylaziridine, 2,2-dimethylaziridine, azetidine, 2-ethylazetidine, 3-octylazetidine, 3,3-dimethylazetidine, 2,2,4-trimethylazetidine, pyrrolidine, 2-propylpyrrolidine, 3-butylpyrrolidine, 2-isohexylpyrrolidine, 2,3-dimethylpyrrolidine, 2,2,4-trimethylpyrrolidine, 2,5-diethylpyrrolidine, 3,4-dioctylpyrrolidine, piperidine, 2-methylpiperidine, 3-ethylpiperidine, 4-butylpiperidine, 2,4,6-trimethylpiperidine, 2-methyl-5-ethylpiperidine, 3,5-dipentylpiperidine, hexahydroazepine, 2-ethylhexahydroazepine, 4-tert-butylhexahydroazepine, 3,3 - dimethylhexahydroazepine, 2,4,6-tripropylhexahydroazepine, heptamethylenimine, 2-methylheptamethylenimine, 2,4 - diisopropylheptamethylenimine, octamethylenimine, 4 - isooctyloctamethylenimine, morpholine, 2-ethylmorpholine, 2-methyl-5-ethylmorpholine, 2,6-dimethylmorpholine, and the like.

In the same manner, cyanuric chloride can be transformed to Formula V triazines. In that case, an alkenylamine, dialkenylamine or alkylalkenyl amine of the formula

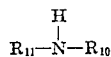

is used at one chlorine replacement stage and $R_{12}NH_2$ at another, wherein $R_{10}$, $R_{11}$ and $R_{12}$ are as given above. Alkenylamines, dialkenylamines, and alkylalkenylamines are known in the art or can be prepared by methods known in the art. For example, these amines can be prepared by hydrolyzing a lower-alkenyl cyanamide, prepared as below, or by reacting a lower-alkenyl halide with ammonia or a primary amine of the formula $R_{11}NH_2$. With ammonia, mono- or di-lower-alkenylamines are obtained according to whether 1 or 2 molar proportions of the lower-alkenyl halide is used. With primary amines, di-lower-alkenylamines or lower-alkyl-lower-alkenylamines are obtained according to whether $R_{11}$ is lower alkenyl or lower alkyl. A suitable procedure is set forth in U.S. Patent 2,172,822. Examples of lower alkenyl halides which can be used include allyl chloride, 1-methylallyl chloride, methallyl chloride, 1,1-dimethylallyl chloride, 1,2-dimethylallyl chloride, 2-butenyl chloride, 2-ethylallyl chloride, 1-methyl-2-butenyl chloride, 2-methyl-2-butenyl chloride, 3-methyl-2-butenyl chloride, 3-pentenyl chloride, 4-pentenyl chloride, 1,3-dimethyl-2-butenyl chloride, 2,3-dimethyl-2-butenyl chloride, 1,1,2-trimethylallyl chloride, 1-ethyl-2-butenyl chloride, 4-methyl-2-pentenyl chloride, 4-hexenyl chloride, 2-ethyl-2-pentenyl chloride, 4,4-dimethyl-2-pentenyl chloride, 1,5-dimethyl-4-hexenyl chloride, and the corresponding bromides. Examples of lower alkenylamines which can be used include di-(3-butenyl)amine [Reppe et al., Ann. 596, 80–158 (1955)] and di-(2-methylpropenyl)amine [Seher, Arch. Pharm. 284, 371–82 (1951)], as well as those made by reacting the above lower alkenyl halides with ammonia or a primary amine as described above.

U.S. Patent 2,868,788 also lists $N^2,N^2$-di-(lower alkenyl)-melamines useful as starting materials which on treatment by the process of this invention yield the corresponding Formula II dihydrotriazines.

Triazas of Formulas III and V wherein $R_1$, $R_2$ and $R_{12}$ are hydrogen can also be prepared by reacting an alkali metal salt of 1,3-dicyanoguanidine with a secondary amine, for example, any of the dialkylamines, dialkenylamines, alkylalkenylamines, and heterocyclic amines included herein [Detweiler et al., J. Am. Chem. Soc. 74, 1483–5 (1952); Nagy, U.S. Patent 2,392,608].

Triazines of Formula III wherein either or both $R_1$ and $R_2$ are hydrogen can be prepared by reacting a disubstituted cyanamide [Vliet, Organic Syntheses, Coll. vol. 1, 2d ed., 204 (1948)] with cyanoguanidine (dicyandiamide) [Kaiser, U.S. Patent 2,567,847; Zerweck et al., German Patents 889,593 and 898,591]. This method can also be used to prepare Formula V triazines. For example, a lower alkenyl halide can be reacted with sodium cyanamide, or a primary or secondary amine with cyanogen bromide, to form a mono- or di-substituted cyanamide, $R_{10}R_{11}NCN$ [Vliet, Organic Syntheses, Coll. vol. 1, 2d ed., 203 (1948); Bull. Chem. Soc. Japan 27, 416–21 (1954)], which in turn can be reacted with a dicyandiamide, $R_{12}NHC(NH)NHCN$, according to the procedure of U.S. Patent 2,567,847 to form the desired lower-alkenylmelamine.

The dicyandiamides wherein $R_{12}$ is lower alkenyl or lower alkyl can be prepared by reacting a lower alkenyl or lower alkyl isothiocyanate with sodium cyanamide, methylating to form a cyanoisothiourea of the formula $R_{12}N=C(SCH_3)NHCN$, and reacting the latter with ammonia. [Curd et al., British Patent 599,713; J. Chem. Soc. 1630–6 (1948)].

Perbenzoic acids of Formula IV are known in the art or can be prepared by methods known in the art (Braun, Organic Syntheses, Coll. vol. 1, 2d ed., 431 (1941); Silbert et al., J. Org. Chem. 27, 1336–52 (1962)]. In Formula IV, when $n$ is 2 or more, the X's can be the same or different. Examples of halogen are fluorine, chlorine, bromine, and iodine. Examples of lower alkyl are as given above. Examples of lower alkoxy are methoxy, ethoxy, propoxy, butoxy, pentyloxy, hexyloxy, heptyloxy, octyloxy, and isomeric forms thereof. Suitable oxidizing acids of Formula IV include perbenzoic acid, o-, m-, and p-chloro- and bromoperbenzoic acids, 3,5-dichloroperbenzoic acid, 2,3,5,6 - tetrachloroperbenzoic acid, 4-methylperbenzoic acid, 3,4 - dimethylperbenzoic acid, pentamethylperbenzoic acid, o-, m-, and p-methoxyperbenzoic acids, 3 - nitroperbenzoic acid, 2,4 - dinitroperbenzoic acid, 3 - chloro - 4 - methoxyperbenzoic acid, 3-chloro - 4 - nitroperbenzoic acid, and the like.

In carrying out the reaction between the Formula III or Formula V triazine and the Formula IV perbenzoic acid, the two reactants are mixed advantageously below about 50° C., preferably between about −10° C. and +10° C., although higher or lower temperatures can be used. It is preferred to mix the reactants in the presence of an inert solvent and to stir the mixture until the reaction is substantially complete. Suitable solvents include N-lower-alkylpyrrolidones, e.g., N - methylpyrrolidone; lower alkanols, e.g., methanol, ethanol, propanol, isopropyl alcohol, the butanols, and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula III or Formula V triazine and Formula IV perbenzoic acid can be varied widely. Ratios from about 1:1 to 1:5, preferably from about 1:1.5 to 1:2.5, are suitable.

The 1,2-dihydro-1-hydroxy-1,3,5-triazine of Formula I or Formula II can be isolated from the oxidation reaction mixture by conventional techniques, for example, by successive evaporation of the reaction solvent at reduced pressure, solution of the basic Formula I or Formula II product in aqueous acid, e.g., hydrochloric acid, removal of undesired water-insoluble reaction products by filtration, neutralization of the acidic filtrate, and isolation of the Formula I or II product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

With regard to the production of Formula II dihydrotriazines, the novel peroxidation process of this invention is particularly applicable to the N-oxidation of Formula V melamines with lower-2-alkenyl groups since those groups are particularly resistant to epoxidation. The novel peroxidation process can however be used with other lower-alkenylmelamines within the scope of Formula V and not resistant to epoxidation if the double bond is either regenerated or introduced after N-oxidation, or protected before N-oxidation.

When epoxidation does occur, the double bond can be regenerated by methods known in the art, e.g., by the method of Cornforth et al., J. Chem. Soc. 112–27 (1959), which involves treatment of the epoxide with sodium iodide, sodium acetate, and zinc in acetic acid. The reaction

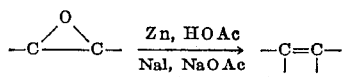

can be conducted in two stages, e.g., treatment of the epoxide with sodium iodide in acetic acid gives the iodohydrin which, in turn, when treated with zinc in acetic acid or stannous chloride in acetic acid gives the olefin.

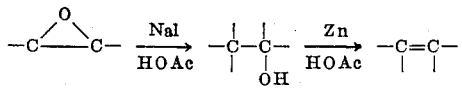

The double bond can be protected by brominating it prior to the oxidation and regenerating it after oxidation by treatment with zinc in a solvent such as ethanol. This in effect is a way of introducing the double bond after the 5-oxidation. Another way of doing this is to start with an N-lower-alkylmelamine having a halo group, e.g., bromo, and a lower alkoxy group, e.g., methoxy, on vicinal carbon atoms, N-oxidize as described above, and generate the double bond by treatment with zinc according to the procedure of Dykstra et al., J. Am. Chem. Soc. 52, 3396 (1930). Another method is to start with an N-(lower-hydroxyalkyl)melamine and dehydrate after the N-oxidation with a dehydrating acid by the procedure of Lucas et al., J. Am. Chem. Soc. 57, 723 (1935). Another procedure is to start with an N-lower-alkylmelamine having a halogen and a carboxy group on vicinal carbon atoms, and generate the double bond by treatment with sodium carbonate by the procedure of Young et al., J. Am. Chem. Soc. 51, 2528 (1929). Another method is to start with an N-epoxyalkylmelamine, N-oxidize as described above, and reduce by the method of Cornforth et al., supra. The starting N-epoxyalkylmelamines can be prepared by substituting the lower-alkenyl halides in the procedures given below by the corresponding epihalohydrins. Examples of such epihalohydrins and methods for their preparation are shown in U.S. Patent 2,061,377. Other methods of protecting carbon-carbon double bonds before peroxidation, or forming or regenerating them after peroxidation will be apparent to those skilled in the art.

The novel compounds of Formula I wherein $R_3$ is di-lower-alkylamino can also be prepared by hydrogenating a compound of the formula:

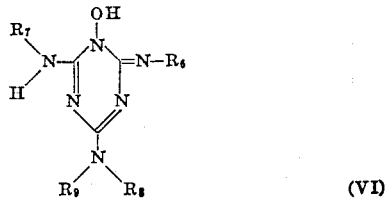

(VI)

wherein $R_8$ is lower alkenyl, wherein $R_9$ is selected from the group consisting of lower alkyl and lower alkenyl, and wherein $R_6$ and $R_7$ are selected from the group consisting of hydrogen, alkyl of 1 to 4 carbon atoms, inclusive, and lower alkenyl of 2 to 4 carbon atoms, inclusive. In this process, each alkenyl group is transformed to the corresponding alkyl group. The Formula VI reactant is not otherwise altered by the hydrogenation. For example, vinyl is transformed to ethyl; allyl is transformed to propyl; 3-methyl-2-butenyl is transformed to isopentyl. Ths method cannot, of course, be used to transform an alkenyl to a methyl but only to an alkyl containing as many carbon atoms as are present in the alkenyl, i.e., two or more carbon atoms. Examples of such alkyl are ethyl, propyl, butyl, pentyl, hexyl, heptyl, octyl, and isomeric forms thereof. Examples of lower alkenyl which can be hydrogenated to such alkyl are vinyl, allyl, 2-methylpropenyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 1,4-dimethyl-4-hexenyl, and the like.

This hydrogenation of a Formula VI dihydrotriazine to a Formula I dihydrotriazine is carried out by mixing the reactant with hydrogen in the presence of a hydrogenation catalyst, for example, a noble metal, e.g., platinum, palladium, rhodium, or a base metal[1], e.g., Raney nickel, Raney cobalt, and in the presence of an inert solvent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred. The Formula I dihydrotriazine can be isolated by conventional techniques, for example, by filtration of the catalyst and evaporation of the solvent, and can be purified as described above.

Some of the 1,2-dihydro-1-hydroxy-1,3,5-triazines encompassed by Formula VI are also encompassed by Formula II. Formula VI compounds not included in Formula II can be represented by the formula:

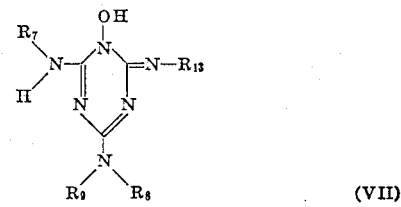

(VII)

wherein $R_7$, $R_8$, and $R_9$ are as given above, and $R_{13}$ is selected from the group consisting of alkyl of 1 to 4 carbon atoms, inclusive, and alkenyl of 2 to 4 carbon atoms, inclusive.

Dihydrotriazines of Formula VII are novel compounds, and, as for the novel dihydrotriazines of Formulas I and II, they exist either in the nonprotonated form or in the protonated form, and form mono- and diacid addition salts on neutralization with suitable acids, for example, those mentioned above. As for the Formula I and Formula II dihydrotriazines, these dihydrotriazines of Formula VII are orally and parenterally active in birds and mammals, including man, as antihypertensive agents having vasodilatory activity. Therefore, in addition to being useful as reactants in the production of Formula I dihydrotriazines, the Formula VII dihydrotriazines can also be used for lowering blood pressure and for the treatment of shock.

Moreover, the Formula VII dihydrotriazines are useful in making aminoplast resins by condensation with formaldehyde and in making pickling inhibitors and mothproofing agents as described above with regard to Formula I and Formula II dihydrotriazines. The acid addition salts of the Formula VII dihydrotriazines are also useful for upgrading the corresponding free bases.

The above Formula VII dihydrotriazines are prepared by N-oxidation of triazines (melamines) of the formula:

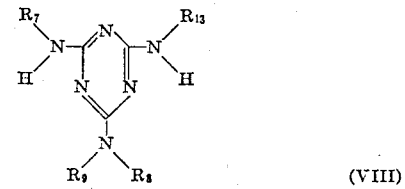

(VIII)

wherein $R_7$, $R_8$, $R_9$, and $R_{13}$ are as given above. This oxidation is carried out as described hereinabove for similar oxidations of Formula III or Formula V triazines with Formula IV perbenzoic acids. It is preferred that the one or more alkenyls present in the Formula VIII triazine be 2-alkenyls because they are particularly resistant to epoxidation by the perbenzoic acid. However, the carbon-carbon double bond may be present in other positions within the alkenyl, and if said double bond is not resistant to epoxidation, it can be either regenerated or introduced after the N-oxidation or protected before the N-oxidation by the methods discussed above.

The N-oxidation reactant triazines of Formula VIII are prepared by any of the methods known in the art, for example, by reaction of cyanuric chloride with an appropriate succession of ammonia, primary amines, and secondary amines as discussed above for the preparation of triazines of Formula III except that appropriate alkenyl-, dialkenyl-, and N-alkylalkenylamines are used in place of the corresponding alkyl- and dialkylamines [Pearlman et al., J. Am. Chem. Soc. 70, 3726–8 (1948)]. The appropriate unsaturated amines can be prepared by reacting a lower alkenyl halide with ammonia or a primary amine (Tamele et al., U.S. Patent No. 2,172,822).

The 1,2-dihydro-1-hydroxy-1,3,5-triazines of Formulas VI and VII can be represented by formulas other than those. As for the Formulas I, IA, and IB, and the Formulas II, IIA, and IIB compounds, these Formulas VI and VII dihydrotriazines are likely to be mixtures of tautomeric forms, the compositions of which are dependent on such factors as the nature of the substituents and the environment. In some instances, one form or another may predominate. Formulas VI and VII are used for convenience, and the other tautomeric forms are not excluded.

Still another method of preparing 1,2-dihydro-1-hydroxy-1,3,5-triazines of Formula I, wherein $R_1$ and $R_2$ are hydrogen, starts with the reaction of a cyanoguanidine (dicyandiamide) of the formula $R_3-C(=NH)NHCN$, wherein $R_3$ is as given above, with cyanogen bromide in the presence of a strong base, e.g., potassium tert-butoxide, to give the salt of the corresponding dicyanoguanidine. Thereafter, the latter is reacted with a hydroxylamine acid addition salt according to the equation:

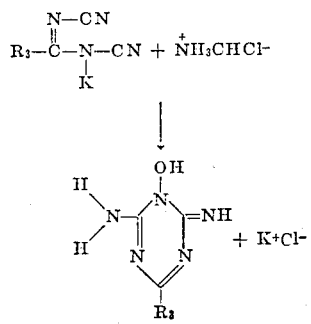

Similarly, 1,2-dihydro-1-hydroxy-1,3,5-triazines of Formulas II and VI wherein $R_6$, $R_7$, and $R_{12}$ are hydrogen can be prepared by reacting cyanoguanidines (dicyandiamides) of the formulas

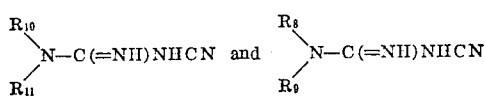

respectively, with cyanogen bromide in the presence of a strong base, and then reacting the resulting dicyanoguanidine with a hydroxylamine acid addition salt to give the desired Formula II or Formula VI dihydrotriazine.

The 1,2-dihydro-1-hydroxy-1,3,5-triazines of Formulas I, II, and VII are transformed to acid addition salts by neutralization with appropriate amounts of the correspond inorganic or organic acid, examples of which are given above. These transformations can be carried out by a variety of procedures known in the art to be generally useful for the preparation of amine acid addition salts. The choice of the most suitable procedure will depend on a variety of factors including convenience of operation, economic considerations, and particularly the solubility characteristics of the Formulas I, II, or VII amine, the acid, and the acid addition salt. If the acid is soluble in water, the basic compound of Formulas I, II, or VII can be dissolved in water containing either one or two equivalent amounts of the acid, and thereafter, the water can be removed by evaporation. If the acid is soluble in a relatively nonpolar solvent, for example, diethyl or diisopropyl ether, separate solutions of the acid and the basic Formulas I, II, or VII dihydrotriazine in such a solvent can be mixed in equivalent amounts, whereupon the acid addition salt will usually precipitate because of its relatively low solubility in the nonpolar solvent. Alternatively, the basic dihydrotriazine can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt.

The 1,2-dihydro-1-hydroxy-1,3,5-triazines of Formulas I, II, and VII also form carboxyacylates on treatment with carboxyacylating agents, for example, carboxylic acid anhydrides and carboxylic acid chlorides. These carboxyacylates are active in birds and mammals, including man, as antihypertensive agents having vasodilating activity, and are useful for lowering blood pressure and for the treatment of shock. The carboxyacylates can also be used for upgrading a Formula I, Formula II, and Formula VII dihydrotriazine free base by transformation of the latter to a carboxyacylate, purification of the carboxyacylate, and then removal of the carboxyacyl moiety or moieties, advantageously by alcoholysis.

Although substantially any carboxyacylating agent can be used to produce these carboxyacylates, especially suitable are the anhydrides, mixed anhydrides, and acid chlorides of alkanoic, cycloalkanoic, alkenoic, cycloalkenoic, aralkanoic, aromatic, and heterocyclic carboxylic acids. These anhydrides and acid chlorides can also be substituted with any of a wide variety of atomic or molecular moieties unreactive with the dihydrotriazine reactants. Examples of such substituents are alkyl, e.g., methyl, butyl, decyl; alkoxy, e.g., methoxy, ethoxy, pentyloxy; alkylthio, e.g., methylthio, propylthio, heptylthio; dialkylamino, e.g., dimethylamino, diethylamino, dihexylamino; alkoxycarbonyl, e.g., methoxycarbonyl, propoxycarbonyl, nonoxycarbonyl; carboxyacyl, e.g., acetyl, butyryl carboxamido, e.g., benzamido, acetamido; nitro; fluoro; cyano; and the like. Chlorine, bromine, and iodine can also be substituents on aromatic portions of the carboxyacylating agents.

Examples of suitable anhydrides are acetic anhydride, propionic anhydride, butyric anhydride, isobutyric anhydride, acrylic anhydride, crotonic anhydride, cyclohexanecarboxylic anhydride, benzoic anhydride, naphthoic anhydride, furoic anhydride, and the like, as well as the corresponding anhydrides substituted with one or more of the above-mentioned substituents. Examples of suitable acid chlorides are acetyl chloride, propionyl chloride, butyryl chloride, isobutyryl chloride, decanoyl chloride, acryloyl chloride, crotonoyl chloride, cyclohexanecarbonyl chloride, 3-cyclohexenecarbonyl chloride, phenylacetyl chloride, succinyl chloride, benzoyl chloride, naphthoyl chloride, furoyl chloride, 3-pyridinecarbonyl chloride, phthaloyl chloride, and the like, as well as the corresponding acid chlorides substituted with one or more of the above-mentioned substituents.

The Formula I, Formula II, and Formula VII dihydrotriazines are easily transformed to carboxyacylates by mixing the dihydrotriazine with an appropriate amount of the anhydride or acid chloride, preferably in the presence of a diluent. At least one molecular equivalent of carboxyacylating agent should be used for the introduction of each carboxyacyl moiety. When reactive carboxyacylating agents such as acetic anhydride are used, a diacyl compound is usually obtained even with only one molecular equivalent of carboxyacylating agent. In such cases, part of the dihydrotriazine reactant does not form a carboxyacylate.

The carboxyacylation usually takes place rapidly in the range about −20° to about +50° C. Suitable diluents are ethers, e.g., diethyl ether and tetrahydrofuran, ketones, e.g., acetone and methyl ethyl ketone; esters, e.g., methyl acetate and ethyl acetate; acetonitrile, pyridine, and the like. The desired carboxyacylate often separates from the reaction mixture in crystalline form, and can be separated in the usual manner, for example, by filtration or centrifugation. Alternatively, the diluent can be evaporated, preferably at reduced pressure. The carboxyacylates can be purified by conventional techniques, for example, by recrystallization from a suitable solvent or mixture of solvents.

The nature of each carboxyacylate depends on such factors as the nature of the dihydrotriazine reactant, the nature and amount of carboxyacylating agent, the reaction time, and the reaction temperature. Usually a monoacylate or a diacylate, or a mixture of those, is obtained, although the formation of a triacylate is observed in some instances. The monoacylates are usually N-acyl compounds. The diacylates are either N,N'-diacyl or O,N-diacyl compounds. Use of the more reactive acylating agents, e.g., acetic anhydride, often results in N,N'-diacylates. The less reactive agents, e.g., benzoic anhydride, usually give N-acylates and/or O,N-diacylates.

Carboxyacylates produced at relatively low temperatures, i.e., about −20° to about 0° C. and with relatively short reaction times, i.e., a few second to about 10 minutes, usually contain larger amounts of N-monoacylate and O,N-diacylate, and less N,N-diacylate, than those produced at higher temperatures, i.e., about 10° C. to about 50° C. and with longer reaction times, i.e., about 30 minutes to several hours.

Carboxyacylates obtained from Formula I dihydrotriazines can be represented by the formula:

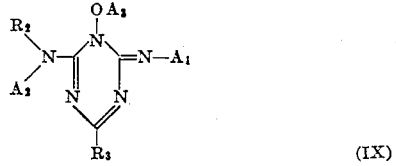

(IX)

wherein $R_2$ is selected from the group consisting of hydrogen and alkyl of 1 to 4 carbon atoms, inclusive, wherein $R_3$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula, wherein $A_1$ is selected from the group consisting of hydrogen, alkyl of 1 to 4 carbon atoms, inclusive, and carboxyacyl, and wherein $A_2$ and $A_3$ are each selected from the group consisting of hydrogen and carboxylacyl, with the proviso that at least one of $A_1$ and $A_2$ is carboxyacyl.

Carboxyacylates obtained from Formula II and Formula VI dihydrotriazines can be represented by the formula:

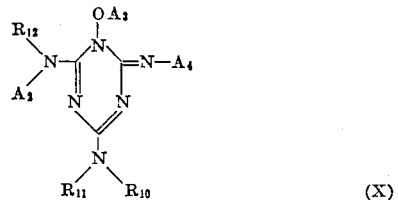

(X)

wherein $R_{10}$ is lower alkenyl, wherein $R_{11}$ and $R_{12}$ are selected from the group consisting of hydrogen, lower alkyl, and lower alkenyl, wherein $A_2$ and $A_3$ are selected from the group consisting of hydrogen and carboxyacyl and wherein $A_4$ is selected from the group consisting of hydrogen, alkyl of 1 to 4 carbon atoms, inclusive, alkenyl of 2 to 4 carbon atoms, inclusive, and carboxyacyl, with the proviso that at least one of $A_2$ and $A_4$ is carboxyacyl.

The dihydrotriazine carboxyacylates of Formulas IX and X can be represented by formulas other than those. As for Formulas I, IA, and IB compounds, these formulas IX and X carboxyacylates are likely to be mixtures of tautomeric forms, the compositions of which are dependent on such factors as the nature of the substituents and the carboxyacyl moieties, and the environment. In some instances, one form or another may predominate. Formulas IX and X are used for convenience, and the other tautomeric forms are not excluded.

Dihydrotriazine carboxyacylates prepared as described above are easily transformed back to the Formulas I, II or VI dihydrotriazine free base, preferably by warming with a lower alkanol, e.g., methanol or ethanol. Simultaneous treatment with a base, for example, gaseous ammonia, usually accelerates the alcoholysis.

The invention can be more fully understood by the following examples.

EXAMPLE 1

*1,2-dihydro-1-hydroxy-6-amino-4-dimethylamino-2-imino-1,3,5-triazine*

A solution of 2,4-diamino-6-dimethylamino-1,3,5-triazine (5.0 g.; 0.032 mole) in 300 ml. of ethylene glycol monomethyl ether at 50° C. was added to a stirred solution of m-chloroperbenzoic acid (11.0 g.; 0.064 mole) in 100 ml. of ethylene glycol monomethyl ether at 5° C. After an initial rise to 30° C., the reaction mixture was cooled to 5° C., stirred for 2 hours, and filtered. The filtrate was evaporated at reduced pressure, the resulting residue was shaken with a solution of 5 ml. of concentrated hydrochloric acid in 50 ml. of water, and the mixture was filtered. The filter cake was washed with 25 ml. of water, and the combined filtrate and washing were adjusted to pH 9 with aqueous sodium hydroxide solution. The 3.2 g. of product which precipitated was filtered and recrystallized from dimethylformamide to give 1.5 g. of 1,2-dihydro-1-hydroxy-6-amino-4-dimethylamino-2-imino-1,3,5-triazine; M.P. 325° C.

Addition of absolute ethanol containing one equivalent of hydrogen chloride to an absolute ethanol solution of 1,2 - dihydro - 1 - hydroxy-6-amino-4-dimethylamino-2-imino-1,3,5-triazine, followed by addition of about 4 volumes of diethyl ether, gives the triazine monohydrochloride. Use of 2 equivalents of hydrogen chloride in this procedure gives the dihydrochloride. Similar use of one equivalent of benzoic acid gives the monobenzoic acid addition salt.

EXAMPLE 2

*Part A.—1,1-dipropyl-3-cyanoguanidine*

A mixture of dipropylamine hydrochloride (13.8 g.; 0.10 mole) and sodium dicyanimide (8.9 g.; 0.10 mole) in 50 ml. of n-butanol was stirred and refluxed for 3 hours. Sodium chloride was then filtered from the reaction mixture, and solvent was removed at reduced pressure. The resulting oily residue solidified when treated with ice water, and was filtered and recrystallized from water to give 13 g. of colorless 1,1-diproyl-3-cyanoguanidine; M.P. 83–84° C.

*Analysis.*—Calcd. for $C_8H_{16}N_4$: C, 57.11; H, 9.59; N, 33.30. Found: C, 57.28; H, 9.05; N, 33.46. U.V.—$(C_2H_5OH)$ 227 mμ (ε=19,700; 274 mμ (ε=284. I.R.—(principal bands; mineral oil mul) 3380, 3320, 3210, 1645, 1575, 1510, 1500, 1225, 1200, 1150, 1100, 1075 cm.$^{-1}$.

Part B.—1,2-dihydro-1-hydroxy-6-amino-4-dipropyl-amino-2-imino-1,3,5-triazine Finely-divided potassium tert-butoxide (2.8 g.; 0.025 mole) was added gradually to a solution of 1,1-dipropyl-3-cyanoguanidine (4.2 g.; 0.025 mole) in 50 ml. of dried tetrahydrofuran at 25–30° C. The mixture was refluxed for 5 minutes and then cooled externally to about 5° C. Finely-divided cyanogen bromide (2.65 g.; 0.025 mole) was added gradually, the reaction temperature rising during the addition to 30° C. The mixture was stirred and allowed to cool to 25° C. during 15 minutes, at which point additional potassium tert-butoxide (2.8 g.; 0.025 mole) was added. After stirring the mixture for an additional 10 minutes, the solvent was removed under reduced pressure and the resulting residue was dissolved in 100 ml. of water. Hydroxylamine hydrochloride (1.74 g.; 0.025 mole) was then added, and the mixture was heated at about 100° C. for 45 minutes, cooled to about 25° C., acidified with dilute hydrochloric acid, and extracted with two 50-ml. portions of chloroform. The aqueous solution was brought to pH 8 with aqueous sodium hydroxide solution and extracted with four 250-ml. portions of chloroform. The combined chloroform extracts were dried and evaporated to a residue which was recrystallized three times from acetonitrile to give 1,2-dihydro-1-hydroxy-6-amino-4-dipropylamino-2-imino-1,3,5-triazine; M.P. 195–197° C.

*Analysis.*—Calcd. for $C_9H_{18}N_6O$: C, 47.77; H, 8.02. Found: C, 48.11; H, 7.95. U.V.—($H_2O$) 211 m$\mu$ ($\epsilon$=37,100); 247 m$\mu$ ($\epsilon$=16,600). (0.01 N $H_2SO_4$) 215 m$\mu$ ($\epsilon$=17,900); 239 m$\mu$ ($\epsilon$=22,400). (0.01 N KOH) 247 m$\mu$ ($\epsilon$=16,600). I.R.—(Principal bands; mineral oil mull) 3420, 3340, 1675, 1627, 1575, 1555, 1490, 1212, 1102 cm.$^{-1}$. N.M.R.—The nuclear magnetic resonance spectrum of this compound in deuterated dimethyl sulfoxide was observed on a Varian A-60 spectrometer. All signals are given in cycles per second downfield from tetramethylsilane which was arbitrarily set at 0 c.p.s. The propyl groups give a typical pattern; a triplet centered at 41.5 c.p.s. (—$CH_3$), a sextet centered at about 74 c.p.s. (—$CH_2$—$\underline{CH_2}$—$CH_3$), and a triplet at about 171 c.p.s. (N—$\underline{CH_2}$—$CH_2CH_3$). Acidic hydrogens (NH and/or OH) appear at 379 c.p.s.

EXAMPLE 3

*1,2-dihydro-1-hydroxy-6-amino-4-diallylamino-2-imino-1,3,5-triazine*

A suspension of 2-diallylamino-4,6-diamino-1,3,5-triazine (57 g.; 0.28 mole) in 1500 ml. of ethanol was stirred and cooled to 5° C. m-Chloroperbenzoic acid (96 g.; 0.56 mole) was added over a period of 20 minutes. The resulting solution was stirred at 0–5° C. for 18 hours. The mixture was evaporated to near dryness under vacuum. Water (150 ml.) and concentrated hydrochloric acid (100 ml.) were added. The resulting suspension was filtered and the solid filter cake was washed twice with 50-ml. portions of water. The combined filtrate and washings were adjusted to pH 9 with aqueous 50% sodium hydroxide solution. The solid which separated was removed by filtration and washed with 50 ml. of water. The combined filtrate and washings were extracted with 300-ml. portions of chloroform until 4 l. of chloroform had been used. The chloroform extracts were combined and dried over anhydrous sodium sulfate, and the solvent was evaporated under reduced pressure. The solid residue was recrystallized twice from acetonitrile to give 31 g. of 1,2-dihydro-1-hydroxy-6-amino-4-diallylamino-2-imino-1,3,5-triazine; M.P. 180.5–183.2° C.

*Analysis.*—Calcd. for $C_9H_{14}N_6O$: C, 48.63; H, 6.35; N, 37.82. Found: C, 48.54; H, 6.17; N, 37.49. U.V.—($H_2O$) 246 m$\mu$ ($\epsilon$=16,250). (0.01 N $H_2SO_4$) 218 m$\mu$ ($\epsilon$=20,050); 237 m$\mu$ ($\epsilon$=25,150). (0.01 N NaOH) 245 m$\mu$ ($\epsilon$=16,050). I.R.—(Principal bands; mineral oil mull) 3438, 3360, 3288, 3070, 3000, 1692, 1667, 1642, 1626, 1620, 1614, 1585, 1548, 1535, 1530, 1523, 1512, 1490, 1407, 1313, 1285, 1202, 932, 912, 767 cm.$^{-1}$. N.M.R.—The nuclear magnetic resonance spectrum, measured on solutions (ca. 0.3 ml. of 0.2 molar) of the sample in deuterated water with a Varian DP-60 spectrometer, calibrated relative to internal water by an audioscillator in conjunction with a frequency counter, showed a complex multiplet of relative area 1 at −90 to −48 c.p.s. ($\beta$-allyl hydrogen), a broad absorption of area 1 at −29 c.p.s. (one of the $\gamma$-allyl hydrogens), two similar multiplets of total area 1 at −18 and −12 c.p.s. (the other $\gamma$-allyl hydrogen), a sharp singlet of area 4 at 0 c.p.s. (exchangeable hydrogens), and a perturbed doublet of area 2 at 39 and 42 c.p.s. ($\alpha$-allyl hydrogens).

Upon neutralization of 1,2-dihydro-1-hydroxy-6-amino-4-diallylamino-2-imino-1,3,5-triazine with an equimolar amount of hydrogen chloride in ethanol, 1,2-dihydro-1-hydroxy-6-amino-4-diallylamino-2-imino-1,3,5-triazine monohydrochloride is obtained. The dihydrochloride is obtained by using 2 moles of hydrogen chloride per mole of the free base.

Following the procedure of Example 3 but substituting for the 2-diallylamino-4,6-diamino-1,3,5-triazine;
2-[bis-(1-methylallyl)amino]-4,6-diamino-1,3,5-triazine;
2-[bis-(2-butenyl)amino]-4,6-diamino-1,3,5-triazine;
2-[bis(3-butenyl)amino]-4,6-diamino-1,3,5-triazine;
2-[bis(1,2-dimethylallyl)amino]-4,6-diamino-1,3,5,-triazine;
2-[bis(1,5-dimethyl-4-hexenyl)amino]-4,6-diamino-1,3,5-triazine;
2,4-bis(methylamino)-6-diallylamino-1,3,5-triazine;
2-amino-4-[bis(1-methylallyl)amino]-6-methylamino-1,3,5-triazine;
2,4-diamino-6-(N-methylallylamino)-1,3,5-triazine;
2,4-bis(ethylamino)-6-(N-ethyl-2-butenylamino)-1,3,5-triazine; and
2,4-bis(allylamino)-6-diallylamino-1,3,5-triazine, there are obtained
1,2-dihydro-1-hydroxy-6-amino-4-[bis(1-methylallyl)amino]-2-imino-1,3,5-triazine;
1,2-dihydro-1-hydroxy-6-amino-4-[bis(2-butenyl)amino]-2-imino-1,3,5-triazine;
1,2-dihydro-1-hydroxy-6-amino-4-[bis(3-butenyl)amino]-2-imino-1,3,5-triazine;
1,2-dihydro-1-hydroxy-6-amino-4-[bis(1,2-dimethylallyl)-amino]-2-imino-1,3,5-triazine;
1,2-dihydro-1-hydroxy-6-amino-4-[bis(1,5-dimethyl-4-hexenyl)amino]-2-imino-1,3,5-triazine;
1,2-dihydro-1-hydroxy-4-diallylamino-6-methylamino-2-methylimino-1,3,5-triazine;
1,2-dihydro-1-hydroxy-4-[bis(1-methylallyl)amino]-2-imino-6-methylamino-1,3,5-triazine;
1,2-dihydro-1-hydroxy-6-amino-2-imino-4-(N-methylallylamino)-1,3,5-triazine;
1,2-dihydro-1-hydroxy-6-ethylamino-4-(N-ethyl-2-butenylamino)-2-ethylimino-1,3,5-triazine; and
1,2-dihydro-1-hydroxy-6-allylamino-2-allylimino-4-diallylamino-1,3,5-triazine, respectively.

Also following the procedures of Example 3 but substituting for the 2-diallylamino-4,6-diamino-1,3,5-triazine,
2,4-diamino-6-[bis(2-methylpropenyl)amino]-1,3,5-triazine,
2,4-diamino-6-[bis(1,1-dimethylallyl)amino]-1,3,5-triazine,
2,4-diamino-6-[bis(2-ethylallyl)amino]-1,3,5-triazine,
2,4-diamino-6-[bis(1-methyl-2-butenyl)amino]-1,3,5-triazine,
2,4-diamino-6-[bis(2-methyl-2-butenyl)amino]-1,3,5-triazine, 2,4-diamino-6-[bis(3-methyl-2-butenyl)amino]-1,3,5-triazine,
2,4-diamino-6-[bis(3-pentenyl)amino]-1,3,5-triazine,
2,4-diamino-6-[bis(2,3-dimethyl-2-butenyl)amino]-1,3,5-triazine,
2,4-diamino-6-[bis(1,1,2-trimethyallyl)amino]-1,3,5-triazine,
2,4-diamino-6-[bis(1,3-dimethyl-2-butenyl)amino]-1,3,5-triazine,
2,4-diamino-6-[bis(1-ethyl-2-butenyl)amino]-1,3,5-triazine,
2,4-diamino-6-[bis(4-methyl-2-pentenyl)amino]-1,3,5-triazine,
2,4-diamino-6-[bis(2-ethyl-2-pentenyl)amino]-1,3,5-triazine, and
2,4-diamino-6-[bis(4,4-dimethyl-2-pentenyl)amino]-1,3,5-triazine there are obtained
1,2-dihydro-1-hydroxy-6-amino-4-[bis(2-methylpropenyl)amino]-2-imino-1,3,5-triazine,
1,2-dihydro-1-hydroxy-6-amino-4-[bis(1,1-dimethylallyl)amino]-2-imino-1,3,5-triazine
1,2-dihydro-1-hydroxy-6-amino-4-[bis(2-ethylallyl)amino]-2-imino-1,3,5-triazine,
1,2-dihydro-1-hydroxy-6-amino-4-[bis(1-methyl-2-butenyl)amino]-2-imino-1,3,5-triazine,
1,2-dihydro-1-hydroxy-6-amino-4-[bis(2-methyl-2-butenyl)amino]-2-imino-1,3,5-triazine,
1,2-dihydro-1-hydroxy-6-amino-4-[bis(3-methyl-2-butenyl)amino]-2-imino-1,3,5-triazine,
1,2-dihydro-1-hydroxy-6-amino-4-[bis(3-pentenyl)amino]-2-imino-1,3,5-triazine,
1,2-dihydro-1-hydroxy-6-amino-4-[bis(2,3-dimethyl-2-butenyl)amino]-2-imino-1,3,5-triazine,
1,2-dihydro-1-hydroxy-6-amino-4-[bis(1,1,2-trimethylallyl)amino]-2-imino-1,3,5-triazine,
1,2-dihydro-1-hydroxy-6-amino-4-[bis(1,3-dimethyl-2-butenyl)amino]-2-imino-1,3,5-triazine,
1,2-dihydro-1-hydroxy-6-amino-4-[bis(1-ethyl-2-butenyl)amino]-2-imino-1,3,5-triazine,
1,2-dihydro-1-hydroxy-6-amino-4-[bis(4-methyl-2-pentenyl)amino]-2-imino-1,3,5-triazine,
1,2-dihydro-1-hydroxy-6-amino-4-[bis(2-ethyl-2-pentenyl)amino]-2-imino-1,3,5-triazine, and
1,2-dihydro-1-hydroxy-6-amino-4-[bis(4,4-dimethyl-2-pentenyl)amino]-2-imino-1,3,5-triazine, respectively.

EXAMPLE 4

*1,2-dihydro-1-hydroxy-6-amino-4-dipropylamino-2-imino-1,3,5-triazine*

A solution of 1,2-dihydro-1-hydroxy-6-amino-4-diallylamino-2-imino-1,3,5-triazine (2.2 g.; 0.01 mole) in 150 ml of ethanol was shaken for 30 minutes with hydrogen at 40 lbs. initial pressure in the presence of 10 mg. of finely divided platinum (from platinum oxide). The resulting solution was filtered and evaporated to dryness. The residue was recrystallized four times from acetonitrile to give 1,2-dihydro-1-hydroxy-6-amino-4-dipropylamino-2-imino-1,3,5-triazine; M.P. 190–193° C. This material did not depress the melting point of the material obtained in Example 2, Part B. There were no significant differences in the I.R., U.V., and N.M.R. spectra of these two materials.

*Analysis.*—Calcd. for $C_9H_{18}N_6O$: C, 47.77; H, 8.02; N, 37.14. Found: C, 47.99; H, 8.06; N, 36.33. U.V.—($H_2O$) 210.5 m$\mu$ ($\epsilon$=36,950); 247 m$\mu$ ($\epsilon$=16,800). (0.01N HCl) 214 m$\mu$ ($\epsilon$=18,900); 238 m$\mu$ ($\epsilon$=23,150). (0.01N NaOH) 247 m$\mu$ ($\epsilon$=16,600) I.R.—(Principal bands; mineral oil mull) 3420, 3340, 1675, 1627, 1575, 1555, 1490, 1212, 1102 cm.$^{-1}$.

Following the procedure of Example 4, but substituting for the 1,2-dihydro-1-hydroxy-6-amino-4-diallylamino-2-imino-1,3,5-triazine, each of the first ten 1,2-dihydro-1-hydroxy-1,3,5-triazines listed in Example 3 in the order listed, there are obtained 1,2-dihydro-1-hydroxy-6-amino-4-di-sec-butylamino-2-imino-1,3,5-triazine;
1,2-dihydro-1-hydroxy-6-amino-4-dibutyl-amino-2-imino-1,3,5-triazine;
1,2-dihydro-1-hydroxy-6-amino-4-dibutylamino-2-imino-1,3,5-triazine;
1,2-dihydro-1-hydroxy-6-amino-4-[bis(1,2-dimethylpropyl)amino]-2-imino-1,3,5-trazine;
1,2-dihydro-1-hydroxy-6-amino-4-[bis(1,5-dimethylhexyl)amino]-2-imino-1,3,5-triazine;
1,2-dihydro-1-hydrovy-4-dipropylamino-6-methylamino-2-methylimino-1,3,5-triazine;
1,2-dihydro-1-hydroxy-4-di-sec-butylamino-2-imino-6-methylamino-1,3,5-triazine;
1,2-dihydro-1-hydroxy-6-amino-2-imino-4-(N-methylpropylamino)-1,3,5-triazine;
1,2-dihydro-1-hydroxy-6-ethylamino-4-(N-ethylbutylamino)-2-ethylimino-1,3,5-triazine; and
1,2-dihydro-1-hydroxy-4-dipropylamino-6-propylamino-2-propylimino-1,3,5-triazine, respectively.

EXAMPLE 5

*Part A.—2,4-diamino-6-dipropylamino-1,3,5-triazine*

A mixture of 2-diallylamino-4,6-diamino-1,3,5-triazine (15.0 g.; 0.072 mole), 200 ml. of methanol, and 0.5 g. of platinum oxide was shaken with hydrogen at 50 lbs. initial pressure for one hour. After addition of about an equal volume of water, the reaction mixture was purged with nitrogen for 2 hours and filtered. The filter cake was washed with water, dissolved in hot ethanol, and filtered. Cooling and filtration gave 10.4 g. of 2,4-diamino-6-dipropylamino-1,3,5-triazine; M.P. 195–197° C.

*Analysis.*—Calcd. for $C_9H_{18}N_6$: C, 51.40; H, 8.62; N, 39.97. Found: C, 51.39; H, 8.38; N, 40.14. U.V.—($C_2H_5OH$) 241 m$\mu$ ($\epsilon$=27,500). I.R. — (Principal bands; mineral oil mull) 3510, 3310, 3200 (sh.), 3130, 1687, 1630, 1577 (sh.), 1570 (sh.), 1550, 1525, 1505, 1485 cm.$^{-1}$.

*Part B.—1,2-dihydro-1-hydroxy-6-amino-4-dipropylamino-2-imino-1,3,5-triazine*

The procedure of Example 3 was followed except that 2,4-diamino-6-dipropylamino-1,3,5-triazine was used in place of 2-diallylamino-4,6-diamino-1,3,5-triazine. There was obtained 1,2-dihydro-1-hydroxy-6-amino-4-dipropylamino-2-imino-1,3,5-triazine. This material did not depress the melting point of the material obtained in Example 2, Part B or Example 4. There were no significant differences in the I.R. and U.V. spectra of these three materials.

Addition of absolute ethanol containing one equivalent of hydrogen chloride to an absolute ethanol solution of 1,2 - dihydro - 1 - hydroxy - 6 - amino-4-dipropylamino-2-imino-1,3,5-triazine, followed by addition of about 4 volumes of diethyl ether, gives the triazine monohydrochloride. Use of 2 equivalents of hydrogen chloride in this procedure gives the dihydrochloride. Similar use of one equivalent of benzoic acid gives the monobenzoic acid addition salt.

EXAMPLE 6

*1,2-dihydro-1-hydroxy-6-amino-4-dibutylamino-2-imino-1,3,5-triazine*

A solution of 2,4-diamino-6-butylamino-1,3,5-triazine (11.9 g.; 0.05 mole) in 150 ml. of methanol was added to a stirred solution of m-chloroperbenzoic acid (17.2 g.; 0.10 mole) in 50 ml. of methanol at 0° C. After stirring for 5 hours at 5–10° C., the mixture was concentrated at reduced pressure. The residue was shaken with a solution of 10 ml. of concentrated hydrochloric acid in 100 ml. of water, filtered, and washed with 50 ml. of water. The combined filtrate and washing were adjusted to pH 9 with aqueous sodium hydroxide solution. The gum (7.2 g.) which precipitated was separated, dissolved in chloroform, and adsorbed on a 100-g. column of Florisil (60–100 mesh; a magnesium trisilicate; obtained from the Floridin Company, Warren, Pa.). After elution of unreacted starting triazine with 2400 ml. of chloroform, elution with 1200 ml. of chloroform containing 5 percent methanol, evaporation of the eluate, and recrystallization of the resulting residue from a mixture of ethyl acetate and hexane gave 1.5 g. of 1,2-dihydro-1-hydroxy-6-amino-4-dibutylamino-2-imino-1,3,5-triazine; M.P. 148–151° C. (softened at 134° C.).

*Analysis.*—Calcd. for $C_{11}H_{22}N_6O$: C, 51.94; H, 8.72. Found: C, 51.91; H, 8.37. U.V.—($H_2O$) 210 m$\mu$ ($\epsilon$=33,400); 247 m$\mu$ ($\epsilon$=14,550). (0.01 N $H_2SO_4$) 216 m$\mu$ (sh.) ($\epsilon$=17,150); 238 m$\mu$ ($\epsilon$=20,500). (0.01 N KOH) 213 m$\mu$ ($\epsilon$=35,900); 247 m$\mu$ ($\epsilon$=14,050). I.R.—(Principal bands; mineral oil mull) 3305, 3165, 1660, 1615, 1585, 1514, 1500, 763 cm.$^{-1}$.

Following the procedures of Example 1 or Example 6 but substituting for the reactant triazine used in those examples, 2,4-diamino-6-(N-methylethylamino)-1,3,5-triazine;
2,4-diamino-6-diethylamino-1,3,5-triazine;
2,4-diamino-6-diisopropylamino-1,3,5-triazine;
2,4-diamino-6-(N-methylpropylamino)-1,3,5-triazine;
2,4-diamino-6-di-sec-butylamino-1,3,5-triazine;
2,4-diamino-6-di-tert-butylamino-1,3,5-triazine;
2,4-diamino-6-(N-ethylbutylamino)-1,3,5-triazine;
2,4-diamino-6-diisopentylamino-1,3,5-triazine;
2,4-diamino-6-dihexylamino-1,3,5-triazine;
2,4-diamino-6-(N-methylheptylamino)-1,3,5-triazine;
2,4-diamino-6-diisooctylamino-1,3,5-triazine;
2-amino-4-dimethylamino-6-methylamino-1,3,5-triazine;
2,4-bis(methylamino)-6-diethylamino-1,3,5-triazine;
2-amino-4-dibutylamino-6-ethylamino-1,3,5-triazine; and
2,4-bis(butylamino)-6-dibutylamino-1,3,5-triazine, there are obtained 1,2-dihydro-1-hydroxy-6-amino-2-imino-4-(N-methylethylamino)-1,3,5-triazine;
1,2-dihydro-1-hydroxy-6-amino-4-diethylamino-2-imino-1,3,5-triazine;
1,2-dihydro-1-hydroxy-6-amino-4-diisopropylamino-2-imino-1,3,5-triazine;
1,2-dihydro-1-hydroxy-6-amino-2-imino-4-(N-methylpropylamino)-1,3,5-triazine;
1,2-dihydro-1-hydroxy-6-amino-4-di-sec-butylamino-2-imino-1,3,5-triazine;
1,2-dihydro-1-hydroxy-6-amino-4-di-tert-butylamino-2-imino-1,3,5-triazine;
1,2-dihydro-1-hydroxy-6-amino-4-(N-ethylbutylamino)-2-imino-1,3,5-triazine;
1,2-dihydro-1-hydroxy-6-amino-4-diisopentylamino-2-imino-1,3,5-triazine;
1,2-dihydro-2-hydroxy-6-amino-4-dihexylamino-2-imino-1,3,5-triazine;
1,2-dihydro-1-hydroxy-6-amino-2-imino-4-(N-methylheptylamino)-1,3,5-triazine;
1,2-dihydro-1-hydroxy-6-amino-4-diisooctylamino-2-imino-1,3,5-triazine;
1,2-dihydro-1-hydroxy-4-dimethylamino-2-imino-6-methylamino-1,3,5-triazine;
1,2-dihydro-1-hydroxy-4-diethylamino-6-methylamino-2-methylimino-1,3,5-triazine;
1,2-dihydro-1-hydroxy-4-dibutylamino-6-ethylamino-2-imino-1,3,5-triazine; and
1,2-dihydro-1-hydroxy-6-butylamino-2-butylimino-4-dibutylamino-1,3,5-triazine, respectively.

EXAMPLE 7

*1,2-dihydro-1-hydroxy-6-amino-2-imino-4-(1-pyrrolidinyl)-1,3,5-triazine*

A solution of 2,4-diamino-6-(1-pyrrolidinyl)-1,3,5-triazine (10.0 g.; 0.055 mole) in 300 ml. of ethylene glycol monomethyl ether was added at 50° C. to a stirred solution of m-chloroperbenzoic acid (9.5 g.; 0.055 mole) in 100 ml. of ethanol at −5° C. After an initial rise to 35° C., the mixture was cooled and stirred at 5° C. for 5 hours. Thereafter, the solvents were evaporated, the residue was shaken with a solution of 10 ml. of concentrated hydrochloric acid in 100 ml. of water, and the mixture was filtered. The filtrate was adjusted to pH 9 with aqueous sodium hydroxide solution, filtered, cooled at 5° C. for 24 hours, and filtered again. The second filter cake was heated with methanol (150 ml.) and filtered. The methanol filtrate was cooled and filtered twice. The combined filter cakes from the methanol filtrations were recrystallized from methanol (30 ml.) to yield 0.7 g. of 1,2-dihydro-1-hydroxy-6-amino-2-imino-4-(1-pyrrolidinyl)-1,3,5-triazine; M.P. 280–280.5° C. (with decomposition; darkened at 268° C.).

*Analysis.*—Calcd. for $C_7H_{12}N_6O$: N, 42.84. Found: N, 42.42. U.V.—($C_2H_5OH$) 238 m$\mu$ (sh.) ($\epsilon$=12,191). (0.01 N $H_2SO_4$) 218 m$\mu$ ($\epsilon$=19,900); 240 m$\mu$ ($\epsilon$=24,400). (0.01 N KOH) 202 m$\mu$ ($\epsilon$=11,500). I.R.—(Principal bands; mineral oil mull) 3430, 3360, 3160, 1670, 1630, 1575–1500, 1240, 1195, 1020, 810, 775 cm.$^{-1}$.

Addition of absolute ethanol containing one equivalent of hydrogen chloride to an absolute ethanol solution of 1,2-dihydro-1-hydroxy-6-amino-2-imino-4-(1-pyrrolidinyl)-1,3,5-triazine followed by addition of about 4 volumes of diethyl ether gives the triazine monohydrochloride. Use of 2 equivalents of hydrogen chloride in this procedure gives the dihydrochloride. Similar use of one molecular amount of phosphoric acid gives the monophosphoric acid addition salt.

EXAMPLE 8

*1,2-dihydro-1-hydroxy-6-amino-4-(1-aziridinyl)-2-imino-1,3,5-triazine*

Following the procedure of Example 7, 1,2-dihydro-1-hydroxy-6-amino-4-(1-aziridinyl)-2-imino-1,3,5-triazine is obtained by oxidation of 2-(1-aziridinyl)-4,6-diamino-1,3,5-triazine with 2 molecular equivalents of m-chloroperbenzoic acid.

EXAMPLE 9

*1,2-dihydro-1-hydroxy-6-amino-2-imino-4-piperidino-1,3,5-triazine*

A solution of 2,4-diamino-6-piperidino-1,3,5-triazine (6.0 g.; 0.03 mole) in 50 ml. of N-methylpyrrolidone was added in one portion to a stirred solution of m-chloroperbenzoic acid (10.6 g.; 0.06 mole) in 200 ml. of methanol at 0–5° C. After stirring for 6 hours at 0–5° C., the methanol was evaporated at reduced pressure. A solution of 5 ml. of concentrated hydrochloric acid in 125 ml. of water was added to the residue, and the mixture was cooled and filtered. The filter cake was washed with water, and the combined filtrate and washing were adjusted to pH 9 with aqueous sodium hydroxide solution and extracted with one 400-ml. portion and five 250-ml. portions of chloroform. The combined chloroform extracts were dried with sodium sulfate and concentrated. The N-methylpyrrolidone solution which remained was cooled. The 1.8 g. of solid which precipitated was filtered, washed successively with N-methylpyrrolidone and ether, and dried; M.P. 258–260° C. (with decomposition; softened at 230° C.; darkened at 248° C.). Recrystallization from a mixture of ethanol and water gave 1.0 g. of 1,2-dihydro-1-hydroxy-6-amino-2-imino-4-piperidino-1,3,5-triazine; M.P. 278° C. (with decomposition; discolored at 255° C.; darkened at 273° C.).

*Analysis.*—Calcd. for $C_8H_{14}N_6O$: N, 39.98. Found: N, 39.64. U.V.—($C_2H_5OH$) 213 m$\mu$ ($\epsilon$=15,600); 249 m$\mu$ ($\epsilon$=16,900). (0.01 N ethanolic $H_2SO_4$) 216 m$\mu$ ($\epsilon$=19,250); 239 m$\mu$ ($\epsilon$=26,500). (0.01 N ethanolic KOH) 249 m$\mu$ ($\epsilon$=17,150). I.R.—(Principal bands; mineral oil mull) 3430, 3360, 1657, 1625, 1588, 1512, 1480, 1198, 1025 cm.$^{-1}$.

Addition of absolute ethanol containing one equivalent of hydrogen chloride to an absolute ethanol solution of 1,2 - dihydro - 1 - hydroxy-6-amino-2-imino-4-piperidino-1,3,5-triazine followed by addition of about 4 volumes of diethyl ether gives the triazine monohydrochloride. Use of 2 equivalents of hydrogen chloride in this procedure gives the dihydrochloride. Similar use of one molecular amount of lactic acid gives the monolactic acid addition salt.

EXAMPLE 10

*Part A.—2,4-diamino-6-(1-hexahydroazepinyl)-1,3,5-triazine*

Hexamethylenimine (39.6 g.; 0.40 mole) was added to a stirred mixture of 2-chloro-4,6-diamino-1,3,5-triazine (58.0 g.; 0.40 mole), sodium hydroxide (16.0 g.; 0.40 mole), and 500 ml. of water. The mixture was refluxed 24 hours, cooled, and filtered. The filter cake was washed with water, dried, refluxed about 30 minutes with 1500 ml. of ethanol, and filtered. The ethanol filtrate was cooled to about 25° C., and the solid which precipitated was filtered and dried, giving 26.0 g. of 2,4-diamino-6-(1-hexahydroazepinyl)-1,3,5-triazine; M.P. 240–242.5° C. (softened at 236° C.).

Analysis.—Calcd. for $C_9H_{16}N_6$: C, 51.90; H, 7.74. Found: C, 52.48; H, 7.81. U.V.—($C_2H_5OH$) 226 mμ (sl. sh.) ($\epsilon$=22,300). (0.01 N $H_2SO_4$) 220 mμ (sh.) ($\epsilon$=18,650); 241 mμ ($\epsilon$=26,600). I.R.—(Principal bands; mineral oil mull) 3495, 3320, 3155, 1673, 1625, 1545, 1040 cm.$^{-1}$.

*Part B.—1,2-dihydro-1-hydroxy-6-amino-4-(1-hexahydroazepinyl)-2-imino-1,3,5-triazine*

A solution of 2,4-diamino-6-(1-hexahydroazepinyl)-1,3,5-triazine (15.0 g.; 0.07 mole) in 200 ml. of ethylene glycol monomethyl ether was added at 50° C. to a stirred solution of m-chloroperbenzoic acid (17.2 g.; 0.10 mole) in 200 ml. of ethanol at −5° C. After stirring at 10–15° C. for 3 hours, the mixture was concentrated at reduced pressure. The residue was shaken with a solution of 20 ml. of concentrated hydrochloric acid in 100 ml. of water, filtered, and washed with water. The combined filtrate and washing were adjusted to pH 9 with aqueous sodium hydroxide solution, and the solid which precipitated was dissolved in chloroform and adsorbed on a 225-g. column of silica (50–100 mesh). After elution of unreacted starting triazine with 3000 ml. of chloroform containing 10 percent methanol, elution was continued first with 6000 ml. of chloroform containing 40 percent methanol, and then with 6000 ml. of methanol. Solvent was removed from the latter two eluates, and the combined residues upon crystallization from a mixture of n-butanol and diethyl ether gave 1,2-dihydro-1-hydroxy-6-amino-4-(1-hexahydroazepinyl)-2-imino-1,3,5-triazine; M.P. 196° C. (with effervescence; softened at 171° C.).

U.V.—($C_2H_5OH$) 244 mμ (sl. sh.) ($\epsilon$=8,556); 268 mμ (sl. sh.) ($\epsilon$=3,250). (0.01 N $H_2SO_4$) 215 mμ ($\epsilon$=20,657); 234 mμ ($\epsilon$=17,470). (0.01 N KOH) 244 mμ (sl. sh.) ($\epsilon$=8,445); 272 mμ (sh.) ($\epsilon$=2,690). I.R.—(Principal bands; mineral oil mull) 3340, 3225, 1592, 1549 cm.$^{-1}$.

EXAMPLE 11

*Part A.—2-(1-azetidinyl)-4,6-diamino-1,3,5-triazine*

Following the procedure of Example 10, Part A, 2-chloro-4,6-diamino-1,3,5-triazine is reacted with azetidine, yielding 2-(1-azetidinyl)-4,6-diamino-1,3,5-triazine.

*Part B.—1,2-dihydro-1-hydroxy-6-amino-4-(1-azetidinyl)-2-imino-1,3,5-triazine*

Following the procedure of Example 10, Part B, 1,2-dihydro-1-hydroxy-6-amino-4-(1-azetidinyl)-2-imino - 1,3,5-triazine is obtained by oxidizing 2-(1-azetidinyl)-4,6-diamino-1,3,5-triazine with 2 molecular equivalents of m-chloroperbenzoic acid.

EXAMPLE 12

*Part A.—2,4-diamino-6-(1-heptamethylenimino)-1,3,5-triazine*

Following the procedure of Example 10, Part A, 2-chloro-4,6-diamino-1,3,5-triazine is reacted with heptamethylenimine, yielding 2,4-diamino-6-(1 - heptamethylenimino)-1,3,5-triazine.

*Part B.—1,2-dihydro-1-hydroxy-6-amino-4-(1-heptamethylenimino)-2-imino-1,3,5-triazine*

Following the procedure of Example 10, Part B, 1,2-dihydro-1-hydroxy-6-amino-4-(1 - heptamethylenimino)-2-imino-1,3,5-triazine is obtained by oxidizing 2,4-diamino-6-(1-heptamethylenimino)-1,3,5-triazine with 2 molecular equivalents of m-chloroperbenzoic acid.

EXAMPLE 13

*Part A.—2,4-diamino-6-(1-octamethylenimino)-1,3,5-triazine*

Following the procedure of Example 10, Part A, 2-chloro-4,6-diamino-1,3,5-triazine is reacted with octamethylenimine, yielding 2,4-diamino-6-(1 - octamethylenimino)-1,3,5-triazine.

*Part B.—1,2-dihydro-1-hydroxy-6-amino-4-(1-octamethylenimino)-2-imino-1,3,5-triazine*

Following the procedure of Example 10, Part B, 1,2-dihydro-1-hydroxy-6-amino-4-(1-octamethylenimino) - 2-imino-1,3,5-triazine is obtained by oxidizing 2,4-diamino-6-(1-octamethylenimino)1,3,5-triazine with 2 molecular equivalents of m-chloroperbenzoic acid.

EXAMPLE 14

*Part A.—2,4-diamino-6-(2,6-dimethylmorpholino)-1,3,5-triazine*

A mixture of 2-chloro-4,6-diamino-1,3,5-triazine (36.2 g.; 0.25 mole), 2,6-dimethylmorpholine (29.0 g.; 0.25 mole), sodium bicarbonate (21.0 g.; 0.25 mole), and 200 ml. of butanol was refluxed for 7 hours. An additional 1600 ml. of butanol were then added, and the mixture was heated to the reflux temperature and filtered. The filtrate was cooled to about 0° C., and the solid which precipitated was filtered and recrystallized from methanol to give 35.0 g. of the methanolate of 2,4-diamino-6-(2,6-dimethylmorpholino)-1,3,5-triazine; M.P. 205–207.5° C.

Analysis.—Calcd. for $C_{10}H_{20}N_6O_2$: C, 46.81; H, 7.82; N, 32.79. Found: C, 46,78; H, 7.56; N, 32.56. U.V.—(ethanolic $H_2SO_4$) 220 mμ (sh.) ($\epsilon$=16,530); 242 mμ ($\epsilon$=27,150). I.R.—(Principal bands; mineral oil mull) 3380, 3310, 3210, 3170, 3020, 2990, 2760, 2530, 1650, 1632, 1562, 1545, 1510, 1483, 1280, 1165, 1135, 1080, 1020 cm.$^{-1}$.

*Part B.—1,2-dihydro-1-hydroxy-6-amino-4-(2,6-dimethylmorpholino)-2-imino-1,3,5-triazine*

A solution of 2,4-diamino-6-(2,6-dimethylmorpholino)-1,3,5-triazine (4.6 g.; 0.02 mole) in 100 ml. of chloroform was added dropwise during one hour to a stirred solution of m-chloroperbenzoic acid (6.9 g.; 0.04 mole) in 100 ml. of ethanol at 0° C. After stirring at 0–5° C. for 5 hours and standing at 25° C. for 15 hours, the solvent was evaporated, and the residue was shaken for 1 hour with solution of 5 ml. of concentrated hydrochloric acid in 50 ml. of water. The mixture was filtered, and the filtrate was adjusted to pH 9 with aqueous sodium hydroxide solution and extracted with four 200-ml. portions of chloroform. Removal of the chloroform from the combined extracts and two crystallizations of the residue from acetonitrile gave 0.4 g. of 1,3-dihydro-1-hydroxy-6-amino-4-(2,6-dimethylmorpholino)-2-imino-1,3,5 - triazine; M.P. 251–252° C. (with decomposition; sintered at 248° C.). Additional product (0.5 g.) with the same melting point was obtained from the alkaline aqueous solution by addition of one-fifth volume of methanol, reextraction with chloroform, and crystallization of the extracted material with acetonitrile.

*Analysis.*—Calcd. for $C_9H_{16}N_6O_2$: C, 44.98; H, 6.71. Found: C, 44.47; H, 6.23. U.V.—($H_2O$) 212 m$\mu$ ($\epsilon$=38,850); 247 m$\mu$ ($\epsilon$=16,500). (0.01 N $H_2SO_4$) 218 m$\mu$ ($\epsilon$=19,400); 239 m$\mu$ ($\epsilon$=25,300). (0.01 N KOH) 247 m$\mu$ ($\epsilon$=16,450). I.R.—(Principal bands; mineral oil mull) 3510, 3340, 3280, 1690, 1660, 1600, 1525, 1495, 1205, 1170, 1150, 1080, 765, 760 cm.$^{-1}$.

A solution of 1,2-dihydro-1-hydroxy-6-amino-4 - (2,6-dimethylmorpholino)-2-imino-1,3,5-triazine in water containing one equivalent of hydrochloric acid (about 1% hydrochloric acid) gives the monohydrochloride when evaporated to dryness. Similar use of 2 equivalents of hydrochloric acid gives the dihydrochloride. Similar use of one molecular amount of sulfuric acid gives the monosulfuric acid addition salt.

EXAMPLE 15

*Part A.*—*2,4-diamino-6-morpholino-1,3,5-triazine*

Following the procedure of Example 14, Part A, 2-chloro-4,6-diamino-1,3,5-triazine is reacted with morpholine, yielding 2,4-diamino-6-morpholino-1,3,5-triazine.

*Part B.*—*1,2-dihydro-1-hydroxy-6-amino-2-imino-4-morpholino-1,3,5-triazine*

Following the procedure of Example 14, Part B, 1,2-dihydro-1-hydroxy-6-amino-2-imino-4-morpholino - 1,3,5-triazine is obtained by oxidizing 2,4-diamino-6-morpholino-1,3,5-triazine with 2 molecular equivalents of m-chloroperbenzoic acid.

EXAMPLE 16

*Part A.*—*2,4-bis(methylamino)-6-piperidino-1,3,5-triazine*

Finely-divided cyanuric chloride (46 g.; 0.25 mole) was added gradually during 1 hour to a stirred solution of 40% aqueous methylamine (46 ml.) in 350 ml. of acetone at −50° C. The temperature was kept below −30° C. during the addition. After stirring for an additional hour at −20° C., the reaction temperature was allowed to rise to +25° C., sodium hydroxide (6.0 g.; 0.15 mole) was added, and the mixture was refluxed for 20 hours. The solid which precipitated was filtered, washed with water, and mixed with 350 ml. of dimethylformamide and 30 ml. of piperidine. This mixture was heated at about 100° C. for 18 hours, and was then cooled, diluted with about two volumes of water, and made alkaline by addition of aqueous sodium hydroxide solution. The resulting mixture was extracted with diethyl ether. The ether extract was dried with potassium carbonate and evaporated. The residue was recrystallized twice from hexane to give 26.0 g. of 2,4-bis(methylamino)-6-piperidino-1,3,5 - triazine; M.P. 111–112° C.

U.V.—($C_2H_5OH$) 218 m$\mu$ ($\epsilon$=4,100). I.R.—(Principal bands; mineral oil mull) 3435, 3260, 3195, 3110, 1613, 1575, 1495, 1285, 1255, 1107, 800 cm.$^{-1}$.

*Part B.*—*1,2-dihydro-1-hydroxy-6-methylamino-2-methylimino-4-piperidino-1,3,5-triazine*

A solution of 2,4-bis(methylamino)-6-piperidino-1,3,5-triazine (8.9 g.; 0.04 mole) in 55 ml. of ethanol was added during 30 minutes to a solution of m-chloroperbenzoic acid (28.5 g.; 0.15 mole) in 200 ml. of ethanol at −5° C. The temperature rose to 50° C. during the addition. Ethanol was then removed from the reaction mixture under reduced pressure. The residue was shaken with a solution of 10 ml. of concentrated hydrochloric acid in 150 ml. of water, and filtered. The filtrate was adjusted to pH 4.9, and the solid which precipitated was filtered. This solid was twice dissolved in dilute hydrochloric acid, each time thereafter the acid solution being brought to pH 4.9 and filtered. The final solid was then dissolved in chloroform. The pH 4.9 water solutions were also extracted with chloroform. The chloroform solution and extracts were combined, dried with sodium sulfate, and evaporated. The resinous residue was refluxed with 50 ml. of acetonitrile and decolorizing carbon, and filtered. Cooling of the filtrate caused precipitation of 2.2 g. of a solid with an indefinite melting point. The filtrate was adsorbed on a column of Florisil (60–100 mesh) and eluted with chloroform in two 100-ml. fractions. Both eluates were evaporated to give solids. Solid from the first eluate melted at 218–219° C. Solid from the second eluate was 1,2-dihydro-1-hydroxy-6-methylamino - 2 - methylimino - 4 - piperidino - 1,3,5 - triazine; M.P. 227–230° C.

U.V.—($C_2H_5OH$):

221 m$\mu$ ($\epsilon$=36,890); 250 m$\mu$ ($\epsilon$=14,750)

(0.01 N $H_2SO_4$):

245 m$\mu$ ($\epsilon$=27,610); 284 m$\mu$ (Sl. sh.) ($\epsilon$=1,190).

(0.01 N KOH) 220 m$\mu$ ($\epsilon$=37,840); 251 m$\mu$ ($\epsilon$=14,280). I.R.—(Principal bands; mineral oil mull) 3330, 3240, 1650, 1595, 1525, 1495, 1289, 1045, 752 cm.$^{-1}$. N.M.R.—The nuclear magnetic resonance spectrum of this compound in deuterochloroform solution was observed on a Varian A–60 spectrometer. All signals are given in cycles per second downfield from tetramethylsilane which was arbitrarily set at 0 c.p.s. The piperidino group gives typical absorption at 94 c.p.s.

(—$CH_2$—$CH_2$—$CH_2$—; area 6H)

and at 227 c.p.s. (N—$CH_2$—; area 4H). The N—$CH_3$ group shows a singlet at 182 c.p.s, area 6H, and the acidic hydrogens (OH or NH) absorb at 439 c.p.s., area 2H.

Following the procedures of Example 1; Example 5, Part B; Example 7; Example 9; or Example 14, Part B, the mono- and diacid addition salts of 1,2-dihydro - 1 - hydroxy - 6 - methylamino - 2 - methylimino-4-piperidino-1,3,5-triazine with hydrochloric acid, sulfuric acid, phosphoric acid, lactic acid, benzoic acid, and succinic acid are prepared.

Following the procedures of any of Examples 7, 9, 10B, 14B, or 16B, but substituting for the reactant triazines used in those examples, 2,4-diamino-6-(2-methyl-1-pyrrolidinyl)-1,3,5-triazine;
2,4-diamino-6-(3-butyl-1-pyrrolidinyl)-1,3,5-triazine;
2,4-diamino-6-(2,5-diethyl-1-pyrrolidinyl)-1,3,5-triazine;
2,4-diamino-6-(4-octylpiperidino)-1,3,5-triazine;
2,4-diamino-6-(5-ethyl-2-methylpiperidino)-1,3,5-triazine;
2,4-diamino-6-(2,4,6-trimethylpiperidino)-1,3,5-triazine;
2,4-diamino-6-(3,3-diethyl-1-hexahydroazepinyl)-1,3,5-triazine;
2,4-diamino-6-(3-ethylmorpholino)-1,3,5-triazine;
2-(1-aziridinyl)-4,6-bis(methylamino)-1,3,5-triazine;
2-amino-4-butylamino-6-(1-pyrrolidinyl)-1,3,5-triazine;
2,4-bis(ethylamino)-6-piperidino-1,3,5-triazine; and
2,4 - bis(propylamino) - 6 - morpholino - 1,3,5 - triazine, there are obtained
1,2-dihydro-1-hydroxy-6-amino-2-imino-4-(2-methyl-1-pyrrolidinyl)-1,3,5-triazine;
1,2-dihydro-1-hydroxy-6-amino-4-(3-butyl-1-pyrrolidinyl)-2-imino-1,3,5-triazine;
1,2-dihydro-1-hydroxy-6-amino-4-(2,5-diethyl-1-pyrrolidinyl)-2-imino-1,3,5-triazine;
1,2-dihydro-1-hydroxy-6-amino-2-imino-4-(4-octylpiperidino)-1,3,5-triazine;
1,2-dihydro-1-hydroxy-6-amino-4-(5-ethyl-2-methylpiperidino)-2-imino-1,3,5-triazine;
1,2-dihydro-1-hydroxy-6-amino-2-imino-4-(2,4,6-trimethylpiperidino)-1,3,5-triazine;
1,2-dihydro-1-hydroxy-6-amino-4-(3,3-diethyl-1-hexahydroazepinyl)-2-imino-1,3,5-triazine;
1,2-dihydro-1-hydroxy-6-amino-4-(3-ethylmorpholino)-2-imino-1,3,5-triazine;
1,2-dihydro-1-hydroxy-4-(1-aziridinyl)-6-methylamino-6-methylimino-1,3,5-triazine;

1,2-dihydro-1-hydroxy-6-butylamino-4-(1-pyrrolidinyl)-
2-imino-1,3,5-triazine;
1,2-dihydro-1-hydroxy-6-ethylamino-2-ethylimino-4-
piperidino-1,3,5-triazine; and
1,2-dihydro-1-hydroxy-4-morpholino-6-propylamino-2-
propylimino-1,3,5-triazine, respectively.

EXAMPLE 17

*1,2-dihydro-1-hydroxy-6-amino-4-dibenzyl-
amino-2-imino-1,3,5-triazine*

A solution of 2,4-diamino-6-dibenzylamino-1,3,5-triazine (6.1 g.; 0.02 mole) in 45 ml. of N-methylpyrrolidone was added during one hour to a stirred solution of m-chloroperbenzoic acid (6.9 g.; 0.04 mole) in 100 ml. of ethanol at 0° C. Stirring was continued for an additional 6 hours at 0–5° C. The solution was then evaporated under reduced pressure at about 100° C. The resulting residue was diluted to about 400 ml. with water, and sodium hydroxide (2.0 g.) in 10 ml. of water was added. This mixture was shaken until a suspension of fine solid developed. The solid was filtered, washed with water, and dissolved in about 50 ml. of hot ethanol. The solid which precipitated on cooling was filtered and recrystallized successively from a mixture of ethanol and water, water, and acetonitrile to give 1.3 g. of 1,2-dihydro-1-hydroxy - 6 - amino - 4 - dibenzylamino - 2 - imino - 1,3,5-triazine; M.P. 251–252° C.

*Analysis.*—Calcd. for $C_{17}H_{18}N_6O$: N, 26.07. Found: N, 25.79. U.V.—$(C_2H_5OH)$ 247 m$\mu$ ($\epsilon$=17,200); 268 m$\mu$ (sl. fl.)($\epsilon$=9,950). (0.01 N $H_2SO_4$) 240 m$\mu$ ($\epsilon$=21,850). (0.01 N KOH) 248 m$\mu$ ($\epsilon$=17,000); 269 m$\mu$ (sl. fl.)($\epsilon$=9,850). I.R.—(Principal bands; mineral oil mull) 3420, 3305, 3020, 1665, 1618, 1585, 1513, 1491, 1193, 1075, 1028, 770, 762 cm.$^{-1}$.

EXAMPLE 18

*Part A.—2-bis(2-hydroxypropyl)amino-4,6-
diamino-1,3,5-triazine*

A mixture of 2-chloro-4,6-diamino-1,3,5-triazine (36.2 g.; 0.25 mole), bis(2-hydroxypropyl)amine (33.2 g.; 0.25 mole), sodium acetate (21.0 g.; 0.26 mole), and 200 ml. of n-butanol was stirred and refluxed for 20 hours. The resulting mixture was filtered at its boiling point. The solid which formed on cooling this filtrate was filtered and recrystallized from acetonitrile to give 14.5 g. of the monoacetic acid salt of 2-bis(2-hydroxypropyl)amino-4,6-diamino-1,3,5-triazine; M.P. 151–152° C.

*Analysis.*—Calcd. for $C_{11}H_{22}N_6O_4$: C, 43.69; H, 7.34; N, 27.80; O, 21.17. Found: C, 43.98; H, 7.53; N, 27.72; O, 20.42. U.V.—$(C_2H_5OH)$ 220 m$\mu$ (sh.) ($\epsilon$=14,100); 240 m$\mu$ ($\epsilon$=20,200). I.R.—(Principal bands; mineral oil mull) 3420, 3330, 3100, 1660, 1614, 1564, 1491 cm.$^{-1}$.

*Part B.—1,2-dihydro-1-hydroxy-6-amino-4-bis(2-hydroxypropyl)amino-2-imino-1,3,5-triazine*

Finely-divided 2 - bis(2 - hydroxypropyl)amino - 4,6-diamino-1,3,5-triazine (6.0 g.; 0.025 mole) was added gradually during 30 minutes to a stirred solution of m-chloroperbenzoic acid (8.6 g.; 0.05 mole) in 100 ml. of ethanol at −5° C. The mixture was then stirred at 0° C. for five hours and at 5° C. for 20 hours. Solvent was removed at reduced pressure, and the residue was shaken with a solution of 5 ml. of concentrated hydrochloric acid in 25 ml. of water and filtered. The solid was washed with three 5-ml. portions of water. The filtrate and washings were combined, adjusted to pH 9 with aqueous sodium hydroxide solution, and evaporated to dryness. The residue was extracted with two 400-ml. portions of boiling acetonitrile and filtered. The combined extracts were cooled, and the solid which precipitated was filtered and recrystallized from acetonitrile to give 0.6 g. of 1,2-dihydro - 1-hydroxy-6-amino-4-bis(2-hydroxypropyl)amino-2-imino-1,3,5-triazine; M.P.: softened at 105° C. with effervescence; glassy oil at 116° C.; gummy liquid at 133° C.; clear gum at 148° C.

*Analysis.*—Calcd. for $C_9H_{18}N_6O_3$: C, 41.85; H, 7.02. Found: C, 41.51; H, 6.87. U.V.—$(H_2O)$ 212 m$\mu$ ($\epsilon$=41,020); 247 m$\mu$ ($\epsilon$=16,260). (0.01 N $H_2SO_4$) 214 m$\mu$ ($\epsilon$=20,355); 240 m$\mu$ ($\epsilon$=25,150). (0.01 N KOH) 247 m$\mu$ ($\epsilon$=16,200). I.R.—(Principal bands; mineral oil mull) 3300, 3170, 1665, 1616, 1585, 1525, 1485, 1200, 1130, 1065 cm.$^{-1}$.

EXAMPLE 19

*Part A.—2-chloro-4-methylamino-6-piperidino-
1,3,5-triazine*

A solution of cyanuric chloride (36.9 g.; 0.20 mole) in 80 ml. of acetone at about 50° C. was poured slowly into 160 ml. of water at about 0° C. To the resulting slurry at 0.5° C. was added dropwise 40% aqueous methylamine (15.6 g.; 0.20 mole) followed by a solution of sodium hydroxide (8.0 g.; 0.20 mole) in 20 ml. of water. The resulting thick slurry was diluted with 200 ml. of water and stirred at 0° C. for one hour. The reaction mixture was then allowed to warm during dropwise addition of piperidine (17.0 g.; 0.20 mole) followed by dropwise addition of a solution of sodium hydroxide (8.0 g.; 0.20 mole) in 20 ml. of water. An additional 200 ml. of water was added and the resulting mixture was stirred at 50–55° C. for 6 hours. It was then cooled and poured into 2000 ml. of water at 0° C. The solid (32.5 g.) was filtered, washed with water, and dried; M.P. 153–205° C. A portion of this was recrystallized from hexane to give 2-chloro - 4 - methylamino-6-piperidino-1,3,5-triazine; M.P. 160–163° C.

*Analysis.*—Calcd. for $C_9H_{14}ClN_5$: C, 47.47; H, 6.20; Cl, 15.57; N, 30.76. Found: C, 47.80; H, 5.98; Cl, 15.87; N, 30.02. U.V.—(isooctane) 227.5 m$\mu$ ($\epsilon$= 27,050); 263 m$\mu$ ($\epsilon$=4,000). I.R.—(Principal bands; mineral oil mull) 3270, 1625, 1585, 1552, 1495, 1240, 1228, 1057 cm.$^{-1}$.

*Part B.—2,4-dipiperidino-6-methylamino-1,3,5-triazine*

A slurry of 2-chloro-4-methylamino-6-piperidino-1,3,5-triazine (32.5 g.; 0.14 mole) in 200 ml. of n-butanol was stirred and heated externally with oil. When the oil temperature reached 55° C., piperidine (11.9 g.; 0.14 mole) was added rapidly. Heating and stirring were continued until the oil temperature reached 95° C. A solution of sodium hydroxide (5.6 g.; 0.14 mole) in 30 ml. of water was then added dropwise. The mixture was stirred and heated for an additional 4 hours at 90–95° C., and then cooled to 20° C. The aqueous layer was separated, and the organic (butanol) layer was washed with water and allowed to stand at about 25° C. for 15 hours. The 1.0 g. of starting triazine which precipitated was filtered, and solvent was removed from the filtrate by reduced pressure distillation. The resulting residue was recrystallized from hexane to give 32.5 g. of solid; M.P. 105–115° C. Two additional recrystallizations of this solid from hexane gave 2,4 - dipiperidino - 6 - methylamino-1,3,5-triazine contaminated with some starting triazine; M.P. 110–118° C.

*Analysis.*—Calcd. for $C_{14}H_{24}N_6$: C, 60.84; H, 8.75; N, 30.41. Found: C, 60.20; H, 8.27; N, 30.35. U.V.—$(C_2H_5OH)$ 229 m$\mu$ ($\epsilon$=45,100); 272 m$\mu$ (sh.) ($\epsilon$=1,150). I.R.—(Principal bands; mineral oil mull) 3340, 3260, 1625, 1575, 1525, 1235, 1123, 1085, 1047, 1023 cm.$^{-1}$.

*Part C.—1,2-dihydro-1-hydroxy-4,6-dipiperidino-
2-methylimino-1,3,5-triazine*

Finely-divided m-chloroperbenzoic acid (11.2 g. of 91.5% pure acid; corresponding to 0.06 mole) was added slowly to a stirred suspension of 2,4-dipiperidino-6-methylamino-1,3,5-triazine (8.3 g.; 0.03 mole) in a mixture of 150 ml. of methanol and 50 ml. of absolute ethanol at 5° C. The reaction mixture was stirred for 7 hours at 0–5° C. and then for 15 hours at about 25° C. The solvents were then evaporated, and the residue was triturated with a solution of sodium hydroxide (2.4 g.; 0.06 mole) in 100 ml. of water. The resulting turbid solution was extracted with five 50-ml. portions of chloroform. The combined chloroform extracts were dried with sodium sulfate and evaporated to give a residue which was twice more treated as above with aqueous sodium hydroxide and chloroform. The final chloroform-soluble residue, a viscous oil, was crystallized from acetonitrile to give 1,2-dihydro - 1-hydroxy-4,6-dipiperidino-2-methylimino-1,3,5-triazine as a tan solid; M.P. 150–160° C. (with decomposition; sintered at 135° C.).

U.V.—($C_2H_5OH$) 231 m$\mu$ ($\epsilon$=30,250); 264 m$\mu$ (sh.) ($\epsilon$=9,550). (0.01 N alc. $H_2SO_4$) 237 m$\mu$ ($\epsilon$=25,750). (0.01 N alc. KOH) 227 m$\mu$ ($\epsilon$=28,900); 256 m$\mu$ (sh.) ($\epsilon$=11,950). I.R.—(Principal bands; mineral oil mull) 3280, 1625, 1570, 1530, 1492, 1250 cm.$^{-1}$.

EXAMPLE 20

*Part A.—3-allylamino-1,2-propanediol*

Glycidol (259 g.) was added with stirring during 10 minutes to a mixture of allylamine (2000 g.) and ethanol (3.5 l.) at 8° C. The resulting mixture was then stirred for 3 hours during which time the temperature of the mixture rose to 33° C. Ethanol and excess allylamine were removed by distillation, and the residue was distilled under reduced pressure to give 328 g. of 3-allylamino-1,2-propanediol, B.P. 108–120° C. at 0.8 mm.; $n_D^{25}$ 1.488.

*Part B.—3-[allyl(4,6-diamino-s-triazin-2-yl)amino]-1,2-propanediol*

A mixture of 2-chloro-4,6-diamino-1,3,5-triazine (341 g.), 3-allylamino-1,2-propanediol (327 g.), and 1670 ml. of water was stirred and heated to 100° C. A solution of sodium hydroxide (70.5 g.) in 235 ml. of water was added gradually during 3 hours at about 100° C. Heating at about 100° C. was then continued for 5 hours, after which the reaction mixture was allowed to cool to about 25° C., and was stirred for about 15 hours. The mixture was filtered, the solid material was washed with water, and the combined filtrate and washings were extracted once with 750 ml. of butanol and then with 3 successive 500-ml. portions of butanol.

The combined butanol extracts were concentrated at reduced pressure, and the residue was dissolved in 2 liters of absolute ethanol and filtered. Insoluble material was washed with 100 ml. of absolute ethanol, and the combined filtrate and washing were concentrated under reduced pressure. The resulting residue was dissolved in 1050 ml. of warm water. This solution was cooled at about 5° C. for 2 days, after which the resulting crystals were filtered, washed with cold water, and dried to give 143 g. of 3-[allyl(4,6-diamino-s-triazin-2-yl)amino]-1,2-propanediol; M.P. 134–138° C.

An additional 59 g. of the same material, M.P. 135–138° C., was obtained by concentration of the above mother liquor to one-half of its original volume, followed by cooling, and then filtration, cold-water washing, and drying of the resulting solid.

*Part C.—1,2-dihydro-1-hydroxy-6-amino-4-[N-allyl(2,3-dihydroxypropylamino)]-2-imino-1,3,5-triazine* m-Chloroperbenzoic acid (228 g.) was added in small portions during 15 minutes to a stirred mixture of 3-[allyl (4,6-diamino-s-triazin-2-yl)amino]-1,2-propanediol (143 g.), absolute ethanol (4 l.), and absolute methanol (2 l.) at 1° C. The resulting mixture was stirred first for 7 hours in the range 0° to 5° C. and then for 18 hours at 25° C. At that point, a starch-iodide test was negative.

The resulting mixture was then evaporated under reduced pressure to give a hard solid residue which was triturated first with 2 l. and then with 1 l. of 10% aqueous hydrochloric acid. The remaining solid was washed with 300 ml. of water, and the combined aqueous acid solutions and washing were clarified by vacuum filtration. The filtrate was brought to pH 10 with 50% aqueous sodium hydroxide solution, and was then extracted four times with butanol (1.5 l., 1.5 l., 1 l., 1 l.).

The combined butanol extracts were evaporated to dryness under reduced pressure. The resulting residue was triturated with 4 l. of absolute ethanol. The mixture was filtered, and the filter cake was washed with 200 ml. of absolute ethanol. The combined ethanol filtrate and washing were concentrated to dryness under reduced pressure. The resulting residue was then triturated with 4 l. of hot acetonitrile. The mixture was filtered, and the residual solid was washed with 300 ml. of acetonitrile.

That residual solid was then dissolved in 3 l. of absolute ethanol. Addition of 3 l. of hexane, followed by cooling for 48 hours at about 5° C. gave a crystalline solid, which was filtered and washed with hexane to give 53 g. of 1,2-dihydro-1-hydroxy-6-amino-4-[N-allyl(2,3-dihydroxypropylamino)] - 2-imino-1,3,5 - triazine; M.P. 160° C. with decomposition.

*Analysis.*—Calcd. for $C_9H_{16}N_6O_3$: C, 42.09; H, 6.30; N, 32.98. Found: C, 42.18; H, 6.29; N, 32.80.

EXAMPLE 21

*1,2-dihydro-1-hydroxy-6-amino-4-dimethallylamino-2-imino-1,3,5-triazine* m-Chloroperbenzoic acid (6.9 g.; 0.04 mole) was dissolved in 150 ml. of 95% ethanol at −5° C. 2,4-diamino-6-dimethallylamino-1,3,5-triazine (4.6 g.; 0.02 mole) was added in portions over a period of 1 hr. to the stirred solution held at −5° to 0° C. The mixture was stirred at 0–5° C. for 5 hours, then allowed to come to room temperature (25° C.).

The reaction mixture was concentrated to a syrup at reduced pressure and the syrup was mixed with 50 ml. of water. Concentrated hydrochloric acid (5 ml.) was added and the mixture was shaken for 1 hour. Solid material was removed by filtration and washed with 15 ml. of water. The combined filtrate and washings were adjusted to pH 9. The mixture was extracted three times with 100-ml. portions of chloroform. The combined chloroform extracts were dried over anhydrous sodium sulfate, then evaporated under reduced pressure. The residue was dissolved in acetonitrile and diluted with ether; 1 g. of material, M.P. 148–165° C., was recovered by filtration. The filtrate was concentrated to give 1 g. of material, M.P. 174–177° C. The latter fraction was recrystallized from ethyl acetate to give 0.7 g. of 1,2-dihydro-1 - hydroxy-6-amino-4 - dimethallylamino-2-imino-1,3,5-triazine, M.P. 175–176° C.

*Analysis.*—Calcd. for $C_{11}H_{18}N_6O \cdot \frac{1}{3} H_2O$: C, 51.54; H, 7.25; N, 32.79; O, 8.31. Found: C, 51.76; H, 7.74; N, 31.55; O, 8.27. U.V.—($H_2O$) 246 m$\mu$ ($\epsilon$=15,000). (0.01 N $H_2SO_4$) 237 m$\mu$ ($\epsilon$=29,600). (0.01 N NaOH) 246 m$\mu$ ($\epsilon$=15,000). I.R.—(Principal bands; mineral oil mull) 3330, 3220, 3065, 1672, 1625, 1592, 1525, 1485, 1190, 1148, 1003, 790, 770 cm.$^{-1}$.

Upon neutralization of 1,2-dihydro-1-hydroxy-6-amino-4-dimethallylamino-2-imino-1,3,5-triazine with an equimolar amount of hydrogen chloride in ethanol, 1,2-dihydro-1-hydroxy-6 - amino-4-dimethallylamino - 2-imino-1,3,5-triazine monohydrochloride is formed. The dihydrochloride is obtained by using 2 moles of hydrogen chloride per mole of the free base.

EXAMPLE 22

*1,2-dihydro-1-hydroxy-6-amino-4-(N-ethylmethallylamino)-2-imino-1,3,5-triazine*

A suspension of 27.2 g. of 2,4-diamino-6-(N-ethylmethallylamino)-1,3,5-triazine (0.14 mole) in 750 ml. ethanol was stirred and cooled to 5° C. m-Chloroperbenzoic acid (48.3 g.; 0.28 mole) was added over a period of 20 minutes. The resulting solution was stirred at 0–5° C. for 18 hours.

The mixture was evaporated to near dryness under vacuum. Water (75 ml.) was added, followed by 50 ml.

of concentrated hydrochloric acid. The resulting suspension was filtered and the solid cake was washed twice with 25-ml. portions of water. The combined filtrate and washings were adjusted to pH 9 with aqueous 50% sodium hydroxide solution. The solid which separated was removed by filtration and washed with water (25 ml.).

The combined filtrate and washings were extracted with 150-ml. portions of chloroform until 2 l. of chloroform had been used. The chloroform extracts were combined and dried over anhydrous sodium sulfate, and the solvent was evaporated under reduced pressure. The solid residue was recrystallized twice from acetonitrile to give 1,2 - dihydro-1-hydroxy - 6-amino-4-(N - ethylmethallylamino)-2-imino-1,3,5-triazine.

Following the procedure of Example 22 but substituting the 2,4-diamino-6-(N-ethylmethallylamino)-1,3,5-triazine by 2,4-diamino-6-(N-methallylamino)-1,3,5-triazine; 2,4,-diamino-6-(N-isopropylallylamino) - 1,3,5-triazine; 2,4-diamino-6 - (N-isobutylallylamino) - 1,3,5-triazine; 2,4-diamino-6-(N-methyl-2-butenylamino)-1,3,5,triazine; 2,4-diamino-6-(N-butyl-2-butenylamino)-1,3,5-triazine; 2,4-diamino-6-(N-methyl-4-pentenylamino)-1,3,5-triazine; 2,4-diamino-6-(N-methylmethallylamino)-1,3,5-triazine; 2,4-diamino-6-(N-propylmethallylamino)-1,3,5-triazine; 2,4-diamino-6-(N-allyl-2-butenylamino) - 1,3,5,-triazine; and 2,4-diamino-6 - (N - allylmethallylamino)-1,3,5-triazine, there are obtained 1,2-dihydro-1-hydroxy-6-amino-4-(N-methylallylamino) - 2-imino-1,3,5-triazine; 1,2-dihydro - 1-hydroxy-6 - amino-4 - (N-isopropylallylamino) - 2-imino-1,3,5-triazine; 1,2-dihydro-1-hydroxy-6-amino-4 - (N-isobutylallylamino) - 2-imino-1,3,5-triazine; 1,2-dihydro-1-hydroxy-6-amino-4 - (N-methyl-2-butenylamino) - 2-imino-1,3,5-triazine; 1,2-dihydro-1-hydroxy-6-amino - 4 - (N-butyl - 2 - butenylamino)-2-imino-1,3,5-triazine; 1,2-dihydro-1-hydroxy-6-amino-4-(N-methyl-4-pentenylamino) - 2-imino - 1,3,5-triazine; 1,2-dihydro-1-hydroxy-6-amino-4 - (N-methylmethallylamino) - 2-imino-1,3,5-triazine; 1,2-dihydro-1-hydroxy-6-amino-4 - (N-propylmethallylamino - 2-imino-1,3,5-triazine; 1,2-dihydro-1-hydroxy-6-amino-4 - (N-allyl-2-butenylamino) - 2-imino-1,3,5-triazine; and 1,2-dihydro-1-hydroxy-6-amino-4-(N-allylmethallylamino)-2-imino-1,3,5-triazine, respectively.

EXAMPLE 23

*Part A.—2-allylamino-4-amino-6-diallylamino-1,3,5-triazine*

To a solution of 11.2 g. of 2-amino-4-chloro-6-diallylamino-1,3,5-triazine dissolved in 50 ml. of dimethylformamide was added 6 g. of allylamine. The solution was heated with stirring to 90–100° C. for 1.5 hr., cooled, and diluted with water. The oil which separated was extracted into chloroform and the chloroform solution was washed with water, dried, and evaporated. The residual oil was distilled in vacuo to give 9.4 g. of 2-allylamino-4-amino-6-diallylamino-1,3,5-triazine as a heavy syrup, B.P. 150–5° C. at 0.16 mm.

*Part B.—1,2-dihydro-1-hydroxy-6-allylamino-4-diallylamino-2-imino-1,3,5-triazine*

To a solution of 9 g. of 2-allylamino-4-amino-6-diallylamino-1,3,5-triazine in 100 ml. of ethanol cooled to 10° C. was added with stirring 12.5 g. of m-chloroperbenzoic acid. The temperature rose to 45° C., then slowly returned to room temperature (25° C.). After 4 hr. the ethanol was removed under vacuum and the residue was slurried in water. Ammonia was added until the mixture was distinctly alkaline. The mixture was extracted several times with chloroform. The chloroform solution was dried and evaporated. The oily residue was chromatographed on a column of magnesium silicate. The column was eluted with a solution of 10% methanol in ethyl acetate. On removal of solvent from the eluate, 1,2-dihydro-1-hydroxy-6-allylamino - 4 - diallylamino-2-imino-1,3,5-triazine was obtained.

By substituting, for the allylamine, other amines of the formula $R_{12}NH_2$, there are obtained the corresponding 1,2 - dihydro-1-hydroxy-6-($R_{12}$-amino)-4-diallylamino-2-imino-1,3,5-triazines, wherein $R_{12}NH_2$ is any of the lower alkenylamines or any of the lower alkylamines disclosed above. By substituting for the 2-amino-4-chloro-6-diallylamino - 1,3,5 - triazine, other 2-amino - 4 - chloro-6-mono- or di-lower-alkenylamino-1,3,5-triazines, there are obtained the corresponding 1,2-dihydro - 1 - hydroxy-6-allylamino - 4 - [N-$R_{11}$($R_{10}$-amino)]-2-imino-1,3,5-triazines, wherein $R_{10}$ is any of the lower alkenyl moieties listed above and $R_{11}$ is hydrogen or any of the lower alkyl or lower alkenyl moieties listed above. By making both substitutions, the corresponding 1,2-dihydro-1-hydroxy-6-($R_{12}$-amino)-4-[N-$R_{11}$($R_{10}$-amino)] - 2 - imino-1,3,5-triazines wherein $R_{10}$ is any of the lower alkenyl moieties listed above, and $R_{11}$ and $R_{12}$ are hydogen or any of the lower alkyl or lower alkenyl moieties listed above.

EXAMPLE 24

*Part A.—2-allylamino-4,6-diamino-1,3,5-triazine*

A mixture of 29.0 g. (0.2 mole) of 2,4-diamino-6-chloro-1,3,5-triazine, 17.0 g. (0.2 mole) of sodium acetate, 50 ml. of allylamine and 100 ml. of ethylene glycol was heated in a pressure bomb at 150° C. for 17 hr. The mixture was concentrated to a small volume, refrigerated at −5° C., and filtered. The solid was recrystallized from 50 ml. of water to yield 3.0 g. of 2-allylamino-4,6-diamino-1,3,5-triazine acetate; M.P. 123–124° C. A sample of this material was heated at 100° C. under vacuum for 5 hr. to remove acetic acid. The 2-allylamino - 4,6 - diamino-1,3,5-triazine thus obtained melted at 178–179° C.

*Analysis.*—Calcd. for $C_6H_{10}N_6$: C, 43.36; H, 6.06; N, 50.57. Found: C, 43.75; H, 5.73; N, 49.89.

*Part B.—1,2-dihydro-1-hydroxy-6-amino-4-allylamino-2-imino-1,3,5-triazine*

On oxidation with m-chloroperbenzoic acid according to the procedure of Example 3, 1,2-dihydro-1-hydroxy-6-amino-4-allylamino-2-imino-1,3,5-triazine was obtained as a monohydrate, M.P. 223–225° C.

U.V.—($H_2O$) 211 mμ ($\epsilon$=41,200); 240 mμ ($\epsilon$=10,900); 265 mμ (sh.) ($\epsilon$=5,400). (0.01 N HCl) 213 mμ ($\epsilon$=26,176); 232 mμ (sh.) ($\epsilon$=19,714). (0.01 N NaOH) 211 mμ ($\epsilon$=39,888); 240 mμ ($\epsilon$=11,010); 269 mμ (sh.) ($\epsilon$=4,714). I.R.—(Mineral oil mull): OH/NH: 3420, 3280, 3120; C=C/C=N: 1697, 1665, 1585, 1515; C—O/C—N: 1210 cm.$^{-1}$.

The NMR spectrum of 1,2-dihydro-1-hydroxy-6-amino-4-allylamino-2-imino-1,3,5-triazine in deuterium oxide solution was observed on a Varian A–60 spectrometer. The spectrum showed an intense singlet absorption, attributed to the exchangeable hydrogens, which was arbitrarily set as 280 c.p.s. downfield from tetramethylsilane absorption frequency. Additional absorptions in the spectrum fit any $ABMX_2$ pattern characteristic of an N-allyl group as observed for example in the NMR spectrum of allylamine [Bhacca, Johnson and Shoolery, "NMR Spectra Catalog," Varian Associates, Palo Alto, California, 1962, Number 38]. A broad doublet at 235 c.p.s. was attributed the N-methylene hydrogens split by the adjacent vinyl hydrogen and broadened by the N-hydrogen. The multiplet at 303 to 325 c.p.s. was judged to be the AB absorption of the ABX portion and was attributed to the terminal methylene hydrogens split by the adjacent vinyl hydrogen which was itself observed as a complex multiplet at 335–380 c.p.s.

EXAMPLE 25

*1,2-dihydro-1-hydroxy-6-acetamido-2-acetylimino-4-diallylamino-1,3,5-triazine*

Acetic anhydride (3 drops) was added with swirling to a suspension of 1,2-dihydro-1-hydroxy-6-amino-4-diallylamino-2-imino-1,3,5-triazine (400 mg.) in 5 ml. of diethyl ether. A clear solution formed rapidly. A solid formed when the glass wall of the reaction vessel was scratched with a glass rod. The solid was filtered and washed with diethyl ether to give 455 mg. of 1,2-dihydro-1-hydroxy-6-acetamido-2-acetylimino - 4 - diallylamino-1,3,5-triazine; M.P. 140–141° C. This material gave a dark red color to alcoholic ferric chloride solution.

Analysis.—Calcd. for $C_{13}H_{18}N_6O_3$: C, 50.97; H, 5.92; N, 27.44. Found: C, 51.40, 51.60; H, 5.73, 5.86; N, 27.00, 27.35. U.V.—($H_2O$) 231 m$\mu$ ($\epsilon$=4,850); 272 m$\mu$ ($\epsilon$=20,000); 320 m$\mu$ ($\epsilon$=4,200). (0.01 N HCl) 230 m$\mu$ ($\epsilon$=37,400); 270 m$\mu$ ($\epsilon$=17,600); 320 m$\mu$ (sh.) ($\epsilon$=2,850). (0.01 N KOH) 250 m$\mu$ ($\epsilon$=20,550); 300 m$\mu$ (sh., weak). I.R.—(Principal bands; mineral oil mull) 3180, 3060, 1740, 1704, 1625, 1545, 1263, 1237, 1170, 1039 cm.$^{-1}$.

Following the procedure of Example 25 but using, in separate experiments, pyridine and acetonitrile in place of diethyl ether, the same product was obtained, even when one mole of acetic anhydride was used per mole of dihydrotriazine reactant.

The triacylate, 1,2-dihydro-1-acetoxy-6-acetamido-2-acetylimino-4-diallylamino-1,3,5-triazine, is obtained by mixing 1,2 - dihydro-1-hydroxy-6-amino-4-diallylamino-2-imino-1,3,5-triazine with acetic anhydride, and allowing the mixture to stand at about 25° C.

EXAMPLE 26

*1,2-dihydro-1-hydroxy-6-butyramido-2-butyrylimino-4-diallylamino-1,3,5-triazine*

Butyric anhydride (3.16 g.) was added with swirling in one portion to a suspension of 1,2-dihydro-1-hydroxy-6-amino-4-diallylamino-2-imino-1,3,5-triazine (2.22 g.) in 50 ml. of dry diethyl ether. A clear solution resulted in about 3 minutes. The solution was filtered and cooled externally with ice. After about 30 minutes of cooling, the needle-like solid was filtered, washed with diethyl ether, and dried to give 1.30 g. of 1,2-dihydro-1-hydroxy-6 - butyramido - 2 - butyrylimino-4-diallylamino-1,3,5-triazine; M.P. 133–134° C.

Analysis.—Calcd. for $C_{17}H_{26}N_6O_3$: C, 56.34; H, 7.23; N, 23.19. Found: C, 56.56; H, 7.27; N, 23.63. U.V.—($H_2O$) 230 m$\mu$ ($\epsilon$=34,350); 272 m$\mu$ ($\epsilon$=17,950); 310 m$\mu$ (sh.) ($\epsilon$=3,950). (0.01 N $H_2SO_4$) 230 m$\mu$ ($\epsilon$=35,800); 271 m$\mu$ ($\epsilon$=16,902); 316 m$\mu$ ($\epsilon$=3,100). (0.01 N KOH) 211.5 m$\mu$ ($\epsilon$=27,550); 255 m$\mu$ ($\epsilon$=23,300); 300 m$\mu$ (sh.) ($\epsilon$=4,150). I.R.—(Principal bands; mineral oil mull) 3180, 1735, 1685, 1625, 1590, 1545, 1525, 1520, 1195, 1165, 1135, 1055, 820, 765 cm.$^{-1}$. N.M.R.—(CDCl$_3$) typical

and

signals; NH/OH, 620 c.p.s. (2H).

Following the procedure of Example 25 but using acetyl chloride in place of the acetic anhydride, the same product is obtained. Also following the procedure of Example 25 but using in place of the acetic anhydride, propionic anhydride; crotonic anhydride; cyclohexanecarboxylic anhydride; isobutyryl chloride; decanoyl chloride; phenylacetyl chloride; 3-methoxybutyric anhydride; p-tert-butylcyclohexanecarbonyl chloride; and p-nitrophenylacetyl chloride, there are obtained 1,2-dihydro-1-hydroxy-4-diallylamino-6-propionamido-2-propionylimino-1,3,5-triazine;
1,2-dihydro-1-hydroxy-6-crotonamido-2-crotonoylimino-4-diallylamino-1,3,5-triazine;
1,2-dihydro-1-hydroxy-6-cyclohexanecarboxamido-2-cyclohexanecarbonylimino-4-diallylamino-1,3,5-triazine;
1,2-dihydro-1-hydroxy-4-diallylamino-6-isobutyramido-2-isobutyrylimino-1,3,5-triazine;
1,2-dihydro-1-hydroxy-6-decanamido-2-decanoylimino-4-diallylamino-1,3,5-triazine;
1,2-dihydro-1-hydroxy-4-diallylamino-6-phenylacetamido-2-phenylacetylimino-1,3,5-triazine;
1,2-dihydro-1-hydroxy-4-diallylamino-6-(3-methoxybutyramido)-2-(3-methoxybutyrylimino)-1,3,5-triazine;
1,2-dihydro-1-hydroxy-6-(p-tert-butylcyclohexanecarboxamido)-2-(p-tert-butylcyclohexanecarbonylimino)-4-diallylamino-1,3,5-triazine; and
1,2-dihydro-1-hydroxy-4-diallylamino-6-(p-nitrophenylacetamido)-2-(p-nitrophenylacetylimino)-1,3,5-triazine, respectively.

Also following the procedure of Example 25 but using in place of the 1,2-dihydro-1-hydroxy-6-amino-4-diallylamino-2-imino-1,3,5-triazine reactant;
1,2-dihydro-1-hydroxy-6-amino-4-dimethylamino-2-imino-1,3,5-triazine;
1,2-dihydro-1-hydroxy-6-amino-4-dipropylamino-2-imino-1,3,5-triazine;
1,2-dihydro-1-hydroxy-6-amino-4-dibutylamino-2-imino-1,3,5-triazine;
1,2-dihydro-1-hydroxy-6-amino-2-imino-4-(1-pyrrolidinyl)-1,3,5-triazine;
1,2-dihydro-1-hydroxy-6-amino-2-imino-4-piperidino-1,3,5-triazine;
1,2-dihydro-1-hydroxy-6-amino-4-(1-hexahydroazepinyl)-2-imino-1,3,5-triazine;
1,2-hydro-1-hydroxy-6-amino-4-(2,6-dimethylmorpholino)-2-imino-1,3,5-triazine;
1,2-dihydro-1-hydroxy-6-amino-4-dibenzylamino-2-imino-1,3,5-triazine; and
1,2-dihydro-1-hydroxy-6-amino-4-dimethallylamino-2-imino-1,3,5-triazine;

there are obtained 1,2-dihydro-1,hydroxy-6-acetamido-2-acetylimino-4-dimethylamino-1,3,5-triazine;
1,2-dihydro-1- hydroxy-6-acetamido-2-acetylimino-4-dipropylamino-1,3,5-triazine;
1,2-dihydro-1-hydroxy-6-acetamido-2-acetylimino-4-dibutylamino-1,3,5-triazine;
1,2-dihydro-1-hydroxy-6-acetamido-2-acetylimino-4-(1-pyrrolidinyl)-1,3,5-triazine;
1,2-dihydro-1-hydroxy-6-acetamido-2-acetylimino-4-piperidino-1,3,5-triazine;
1,2-dihydro-1-hydroxy-6-acetamido-2-acetylimino-4-(1-hexahydroazepinyl)-1,3,5-triazine;
1,2-dihydro-1-hydroxy-6-acetamido-2-acetylimino-4-(2,6-dimethylmorpholino)-1,3,5-triazine;
1,2-dihydro-1-hydroxy-6-acetamido-2-acetylimino-4-dibenzylamino-1,3,5-triazine; and
1,2-dihydro-1-hydroxy-6-acetamido-2-acetylimino-4-dimethallylamino-1,3,5-triazine, respectively.

Also following the procedure of Example 25 but contacting each of the above-mentioned dihydrotriazine reactants with less of the carboxyacylating agent, preferably no more than one molecular equivalent thereof, and in the range about −10° C. to about 10° C., carboxyacylates are obtained which contain substantial amounts of the corresponding O,N-diacylate and/or the corresponding N-monoacylate. For example, in the case of the dihydrotriazine reactant of Example 25, 1,2-dihydro-1-hydroxy-2-acetylimino-6-amino-4-diallylamino - 1,3,5 - triazine and 1,2-dihydro - 1 - acetoxy-2-acetylimino-6-amino-4-diallylamino-1,3,5-triazine are obtained. In the same manner, each of the specific carboxyacylating agents is combined with each of the 1,2-dihydro-1-hydroxy-1,3,5-triazine reactants mentioned above to give the corresponding O,N-diacylate and N-monoacylate.

EXAMPLE 27

*1,2-dihydro-1-benzoyloxy-6-amino-2-benzoylimino-4-diallylamino-1,3,5-triazine*

Benzoic anhydride (4.50 g.; 2 molecular equivalents) was added with swirling to a suspension of 1,2-dihydro-1-hydroxy - 6 - amino-4-diallylamino-2-imino-1,3,5-triazine (2.22 g.) in 50 ml. of dry diethyl ether. A clear solution resulted and crystals began to separate. These crystals were filtered rapidly to give 0.8 g. of impure 1,2-dihydro-1-benzoyloxy-6-amino-2-benzoylimino - 4 - diallylamino-1,3,5-triazine; M.P. 93–94° C. The ether filtrate was cooled externally with ice, and the solid which then separated was filtered, washed with diethyl ether and dried to give 0.7 g. of 1,2-dihydro-1-benzoyloxy-6-amino-2-benzoylimino-4-diallylamino-1,3,5-triazine; M.P. 97–98° C.

*Analysis.*—Calcd. for $C_{23}H_{22}N_6O_3$: C, 64.17; H, 5.15; N, 19.52. Found: C, 63.35; H, 5.25; N, 19.46. U.V.—($H_2O$) 212 m$\mu$ (sh.) ($\epsilon$=9,850), 254 m$\mu$ ($\epsilon$=10,900; 304 m$\mu$ (sh.) ($\epsilon$=1,300). (0.01 N $H_2SO_4$) 238 m$\mu$ ($\epsilon$=11,950). (0.01 N KOH) end absorption; 263 m$\mu$ ($\epsilon$=20,200). I.R.—(Principal bands; mineral oil mull) 3350, 3130, 1780, 1700, 1655, 1620, 1576, 1540, 1490, 1235, 1160, 1065, 760, 735, 690 cm.$^{-1}$. N.M.R.—($CDCl_3$) typical N—$CH_2CH=CH_2$ and

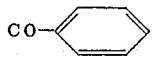

signals; NH, 650 (2H) c.p.s.

EXAMPLE 28

*1,2-dihydro-1-hydroxy-6-amino-2-benzoylimino-4-diallylamino-1,3,5-triazine*

Benzoic anhydride (2.25 g.; one molecular equivalent) was added with swirling to a suspension of 1,2-dihydro-1-hydroxy-6-amino-4-diallylamino-2-imino - 1,3,5 - triazine (2.22 g.) in 50 ml. of dry diethyl ether. A clear solution resulted and crystals began to separate. The diethyl ether was then removed by distillation at reduced pressure, and the resutling total residue was dissolved in chloroform. This chloroform solution was shaken with a saturated aqueous sodium bicarbonate solution. The chloroform layer was separated, dried, and evaporated. The resulting residue was crystallized from acetonitrile to give 1.0 g. of 1,2 - dihydro - 1 - hydroxy-6-amino-2-benzoylimino-4-diallylamino-1,3,5-triazine; M.P. 134–135° C.

*Analysis.*—Calcd. for $C_{16}H_{18}N_6O_2$: C, 58.88; H, 5.56; N, 25.75. Found: C, 58.27; H, 5.64; N, 25.54. U.V.—($H_2O$) 290 m$\mu$ ($\epsilon$=31,900); 252 m$\mu$ ($\epsilon$=31,400); 312 m$\mu$ ($\epsilon$=3,000). (0.01 N $H_2SO_4$) end absorption; 242 m$\mu$ ($\epsilon$=31,800). (0.01 N KOH) 213 m$\mu$ ($\epsilon$=33,100); 255 m$\mu$ ($\epsilon$=21,800). I.R.—(Principal bands; mineral oil mull) 3330, 3280, 1725, 1665, 1640, 1600, 1550, 1495, 1235, 1020, 765, 705 cm.$^{-1}$. N.M.R.—($CDCl_3$) typical N—$CH_2CH=CH_2$ and

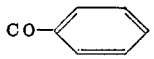

signals; NH/OH 426 (2H), 545 (1H) c.p.s.

EXAMPLE 29

*1,2-dihydro-1-hydroxy-6-benzamido-2-benzoylimino-4-diallylamino-1,3,5-triazine*

The acetonitrile mother liquor from Example 28 was evaporated to dryness, and diethyl ether was added to the residue. Long featherly needles formed. These were filtered and recrystallized from acetonitrile to give 0.1 g. of 1,2-dihydro-1-hydroxy-6-benzamido - 2 - benzoylimino-4-diallylamino-1,3,5-triazine; M.P. 116–118° C.

*Analysis.*—Calcd. for $C_{23}H_{22}N_6O_3$: C,64.17; H, 5.15; N, 19.52. Found: C, 64.17; H, 5.44; N, 19.55. U.V.—(ethanol) 216 m$\mu$ ($\epsilon$=35,050); 236 m$\mu$ ($\epsilon$=30,400); 249 m$\mu$ ($\epsilon$=29,300); 315 m$\mu$ ($\epsilon$=2,750). (0.01 N ethanolic $H_2SO_4$) 235 m$\mu$ ($\epsilon$=41,250); 282 m$\mu$ (sh.) ($\epsilon$=7,000). (0.01 N ethanolic KOH) 221 m$\mu$ ($\epsilon$=36,300); 258 m$\mu$ ($\epsilon$=20,850). I.R.—(Principal bands; mineral oil mull) 3280, 1735, 1635, 1600, 1575, 1515, 1490, 1250, 1185, 760, 710, 690 cm.$^{-1}$. N.M.R.—($CDCl_3$) typical

and

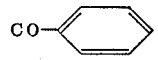

signals; NH/OH, 615 (2H) c.p.s.

Following the procedures of Examples 27, 28, and 29 but using benzoyl chloride in place of benzoic anhydride, the same N-monoacylate, O,N-diacylate, and N,N'-diacylate are obtained.

Also following the procedures of Examples 27, 28, and 29 but using in place of the benzoic anhydride, p-tolunc anhydride; m-chlorobenzoic anhydride; p-methoxybenzoic anhydride; p-(methylthio)benzoyl chloride; o-nitrobenzoyl chloride; 1-naphthoyl chloride, furoyl chloride; and 3-pyridinecarbonyl chloride, there are obtained the corresponding N-monoacylates, O,N-diacylates, and N,N'-diacylates of 1,2 - dihydro-1-hydroxy-6-amino-4-diallylamino-2-imino-1,3,5-triazine.

In the same manner, as described above in Examples 25–29, each of the other specific 1,2-dihydro-1-hydroxy-1,3,5-triazines mentioned above is transformed to one or more of the carboxyacylates within the scope of Formulas IX and X by interaction of a carboxylic acid anhydride or a carboxylic acid chloride.

The above-described carboxyacylates of Formulas IX and X are amines, and exist in either the nonprotonated (free base) form or the protonated (acid addition salt) form depending upon the pH of the environment. They form stable protonates on neutralization with suitable strong acids, for example, hydrochloric acid, sulfuric acid, phosphoric acid, perchloric acid, and the like. These acid addition salts are useful for the same purposes as the carboxyacylate free bases, mentioned above. In addition, these acid addition salts are useful for upgrading the carboxyacylate free bases.

This application is a continuation-in-part of our copending application Serial No. 217,542, filed August 17, 1962, and now abandoned, and of our copending application Serial No. 273,281, filed April 16, 1963, and now abandoned. It should be noted that different but equally correct and unambiguous nomenclature and triazine-ring numbering systems were used in those two applications. For uniformity, only the nomenclature and numbering systems used in Serial No. 273,281 have been used herein. For example, the compound designated "$N^2,N^2$-diallylmelamine 5-oxide" in Serial No. 217,542, is designated herein "1,2-dihydro-1-hydroxy-6-amino-4-diallylamino-2-imino-1,3,5-triazine." Both names refer to the same compound. Application Serial No. 217,542 was a continuation-in-part of our application Serial No. 171,832, filed February 8, 1962, and now abandoned.

We claim:

1. A compound selected from the group consisting of the free base form and acid addition salts of a compound of the formula:

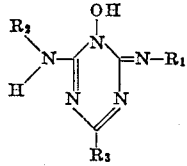

wherein $R_1$ and $R_2$ are selected from the group consisting of hydrogen and alkyl of 1 to 4 carbon atoms, inclusive, and wherein $R_3$ is selected from the group consisting of di-lower-alkylamino and the hetertocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula.

2. A compound selected from the group consisting of the free base form and acid addition salts of a compound of the formula:

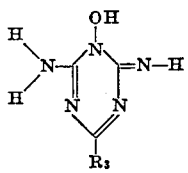

wherein $R_3$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula.

3. A compound selected from the group consisting of the free base form and acid addition salts of a compound of the formula:

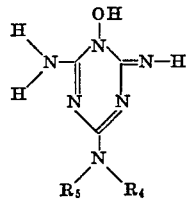

wherein $R_4$ and $R_5$ are lower alkyl.

4. 1,2 - dihydro - 1 - hydroxy - 6 - amino - 4 - dimethylamino-2-imino-1,3,5-triazine.

5. 1,2 - dihydro - 1 - hydroxy - 6 - amino - 4 - dipropylamino-2-imino-1,3,5-triazine.

6. 1,2 - dihydro - 1 - hydroxy - 6 - amino - 4 - dibutylamino-2-imino-1,3,5-triazine.

7. 1,2 - dihydro - 1 - hydroxy - 6 - amino - 2 - imino-4-(1-pyrrolidinyl)-1,3,5-triazine.

8. 1,2 - dihydro - 1 - hydroxy - 6 - amino - 2 - imino-4-piperidino-1,3,5-triazine.

9. 1,2 - dihydro - 1 - hydroxy - 6 - amino - 4 - (1 - hexahydroazepinyl)-2-imino-1,3,5-triazine.

10. 1,2 - dihydro - 1 - hydroxy - 6 - amino - 4 - (2,6-dimethylmorpholino)-2-imino-1,3,5-triazine.

11. 1,2 - dihydro - 1 - hydroxy - 6 - methylamino - 2 - methylimino-4-piperidino-1,3,5-triazine.

12. 1,2 - dihydro - 1 - hydroxy - 6 - amino - 4 - dibenzylamino-2-imino-1,3,5-triazine.

13. 1,2 - dihydro - 1 - hydroxy - 6 - amino - 4 - bis(2-hydroxypropyl)amino-2-imino-1,3,5-triazine.

14. 1,2 - dihydro - 1 - hydroxy - 4,6 - dipiperidino - 2 - methylimino-1,3,5-triazine.

15. 1,2 - dihydro - 1 - hydroxy - 6 - amino - 4 - [N-allyl(2,3 - dihydroxypropylamino)] - 2 - imino - 1,3,5-triazine.

16. A compound selected from the group consisting of the free base form and acid addition salts of a compound of the formula:

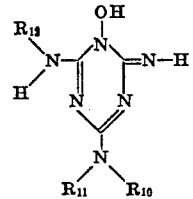

wherein $R_{10}$ is lower alkenyl, and wherein $R_{11}$ and $R_{12}$ are selected from the group consisting of hydrogen, lower alkyl, and lower alkenyl.

17. A compound according to claim 16 wherein $R_{10}$ is lower-2-alkenyl, and $R_{11}$ and $R_{12}$ are hydrogen.

18. A compound according to claim 16 wherein $R_{10}$, and $R_{11}$ are lower-2-alkenyl, and $R_{12}$ is hydrogen.

19. A compound according to claim 16 wherein $R_{10}$, $R_{11}$, and $R_{12}$ are lower-2-alkenyl.

20. 1,2-dihydro-1-hydroxy - 6 - amino-4-diallylamino-2-imino-1,3,5-triazine.

21. 1,2-dihydro - 1 - hydroxy-6-amino-4-allylamino-2-imino-1,3,5-triazine.

22. 1,2-dihydro - 1 - hydroxy - 6 - allylamino-4-diallylamino-2-imino-1,3,5-triazine.

23. 1,2-dihydro-1-hydroxy - 6 - amino- 4 - dimethallylamino-2-imino-1,3,5-triazine.

24. A compound selected from the group consisting of the free base form and acid addition salts of a compound of the formula:

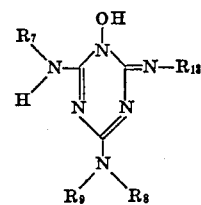

wherein $R_8$ is lower alkenyl, wherein $R_9$ is selected from the group consisting of lower alkyl and lower alkenyl, wherein $R_{13}$ is selected from the group consisting of alkyl of 1 to 4 carbon atoms, inclusive, and alkenyl of 2 to 4 carbon atoms, inclusive, and wherein $R_7$ is selected from the group consisting of hydrogen, alkyl of 1 to 4 carbon atoms, inclusive, and alkenyl of 2 to 4 carbon atoms, inclusive.

25. A compound of the formula:

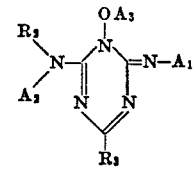

wherein $R_2$ is selected from the group consisting of hydrogen and alkyl of 1 to 4 carbon atoms, inclusive, wherein $R_3$ is selected from the group consisting of di-lower-alkylamino and the heterocyclic moieties, aziridinyl, azetidinyl, pyrrolidinyl, piperidino, hexahydroazepinyl, heptamethylenimino, octamethylenimino, and morpholino, each of said heterocyclic moieties having attached as substituents on carbon atoms thereof zero to 3 alkyls, inclusive, each substituent alkyl being of 1 to 8 carbon atoms, inclusive, the nitrogen atom of $R_3$ being the point of attachment of $R_3$ to the ring in said formula, wherein $A_1$ is selected from the group consisting of hydrogen, alkyl of 1 to 4 carbon atoms, inclusive, and carboxyacyl, and wherein $A_2$ and $A_3$ are each selected from the group consisting of hydrogen and carboxyacyl, with the proviso that at least one of $A_1$ and $A_2$ is carboxyacyl.

26. A compound of the formula:

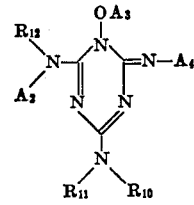

wherein $R_{10}$ is lower alkenyl, wherein $R_{11}$ and $R_{12}$ are selected from the group consisting of hydrogen, lower alkyl, and lower alkenyl, wherein $A_2$ and $A_3$ are selected from the group consisting of hydrogen and carboxyacyl, and wherein $A_4$ is selected from the group consisting of hydrogen, alkyl of 1 to 4 carbon atoms, inclusive, alkenyl of 2 to 4 carbon atoms, inclusive, and carboxyacyl, with the proviso that at least one of $A_2$ and $A_4$ is carboxyacyl.

27. 1,2 - dihydro-1-hydroxy-6-acetamido-2-acetylimino-4-diallylamino-1,3,5-triazine.

28. 1,2 - dihydro - 1 - hydroxy-6-butyramido-2-butyryl-imino-4-diallylamino-1,3,5-triazine.

29. 1,2-dihydro - 1 - benzoyloxy - 6 - amino-2-benzoyl-imino-4-diallylamino-1,3,5-triazine.

30. 1,2-dihydro-1-hydroxy - 6 - amino-2-benzoylimino-4-diallylamino-1,3,5-triazine.

31. 1,2 - dihydro - 1 - hydroxy-6-benzamido-2-benzoyl-imino-4-diallylamino-1,3,5-triazine.

References Cited by the Examiner

UNITED STATES PATENTS

| | | | |
|---|---|---|---|
| 2,729,640 | 1/1956 | Kaiser et al. | 260—249.6 |
| 3,093,645 | 6/1963 | Shaw | 260—249.9 |

OTHER REFERENCES

Fuson: "Reactions of Organic Compounds," Wiley and Sons, Inc., New York (1962), pp. 336-7.

Morrison and Boyd: "Organic Chemistry" (1959), pp. 474, 480-1.

WALTER A. MODANCE, *Primary Examiner.*

JOHN M. FORD, *Assistant Examiner.*